United States Patent
Comer

(10) Patent No.: US 12,033,263 B2
(45) Date of Patent: *Jul. 9, 2024

(54) USING THREE-DIMENSIONAL SCANS OF A PHYSICAL SUBJECT TO DETERMINE POSITIONS AND/OR ORIENTATIONS OF SKELETAL JOINTS IN THE RIGGING FOR A VIRTUAL CHARACTER

(71) Applicant: Magic Leap, Inc., Plantation, FL (US)

(72) Inventor: Sean Michael Comer, Encino, CA (US)

(73) Assignee: MAGIC LEAP, INC., Plantation, FL (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/694,564

(22) Filed: Mar. 14, 2022

(65) Prior Publication Data

US 2022/0207809 A1 Jun. 30, 2022

Related U.S. Application Data

(63) Continuation of application No. 16/400,910, filed on May 1, 2019, now Pat. No. 11,308,673.

(Continued)

(51) Int. Cl.
*G06T 13/40* (2011.01)
*G06T 7/11* (2017.01)
(Continued)

(52) U.S. Cl.
CPC .............. *G06T 13/40* (2013.01); *G06T 7/11* (2017.01); *G06T 7/73* (2017.01); *G06T 17/20* (2013.01); *G06T 2207/30196* (2013.01)

(58) Field of Classification Search
CPC .............. G06T 13/40; G06T 17/20; G06T 2207/30196; G06T 7/11; G06T 7/73
See application file for complete search history.

(56) References Cited

U.S. PATENT DOCUMENTS

| 6,850,221 B1 | 2/2005 | Tickle |
| 9,081,426 B2 | 7/2015 | Armstrong |

(Continued)

FOREIGN PATENT DOCUMENTS

| CN | 101482928 B | 1/2011 |
| WO | WO 2019/213220 | 11/2019 |

OTHER PUBLICATIONS

International Search Report and Written Opinion for PCT Application No. PCT/US 19/30147, dated Jul. 29, 2019.

(Continued)

*Primary Examiner* — Sing-Wai Wu
(74) *Attorney, Agent, or Firm* — KLINTWORTH & ROZENBLAT IP LLP

(57) ABSTRACT

Systems and methods for using three-dimensional scans of a physical subject to determine positions and/or orientations of skeletal joints in the rigging for a virtual character. At least one articulation segment of a polygon mesh for the virtual character may be determined. The articulation segment may include a subset of vertices in the polygon mesh. An indicator of the position or orientation of the articulation segment of the polygon mesh may be determined. Based on the indicator of the position or orientation of the articulation segment, the position or orientation of at least one joint for deforming the polygon mesh may be determined.

22 Claims, 20 Drawing Sheets

Related U.S. Application Data

(60) Provisional application No. 62/666,321, filed on May 3, 2018.

(51) Int. Cl.
   *G06T 7/73* (2017.01)
   *G06T 17/20* (2006.01)

(56) References Cited

U.S. PATENT DOCUMENTS

| | | | |
|---|---|---|---|
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 11,308,673 | B2 | 4/2022 | Comer |
| 2004/0021660 | A1 | 2/2004 | Ng-Thow-Hing et al. |
| 2006/0028436 | A1 | 2/2006 | Armstrong |
| 2007/0081123 | A1 | 4/2007 | Lewis |
| 2008/0043021 | A1* | 2/2008 | Huang .................... G06T 17/20 345/428 |
| 2008/0180448 | A1 | 7/2008 | Anguelov et al. |
| 2009/0232353 | A1 | 9/2009 | Sundaresan et al. |
| 2010/0033488 | A1 | 2/2010 | Zhou et al. |
| 2012/0127062 | A1 | 5/2012 | Bar-Zeev et al. |
| 2012/0162549 | A1 | 6/2012 | Gao et al. |
| 2012/0235886 | A1 | 9/2012 | Border et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0286012 | A1 | 10/2013 | Medioni et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0178988 | A1 | 6/2015 | Mora et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2018/0315230 | A1 | 11/2018 | Black et al. |
| 2019/0340803 | A1 | 11/2019 | Comer |

OTHER PUBLICATIONS

International Preliminary Report on Patentability for PCT Application No. PCT/US 19/30147, dated Nov. 12, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

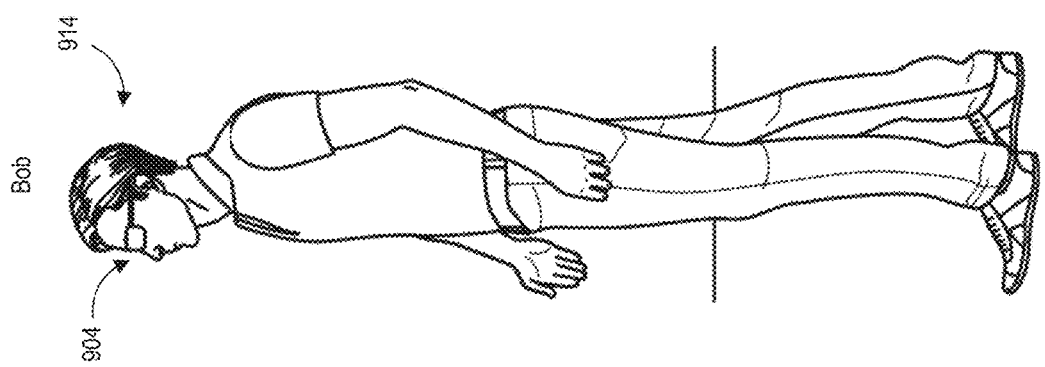
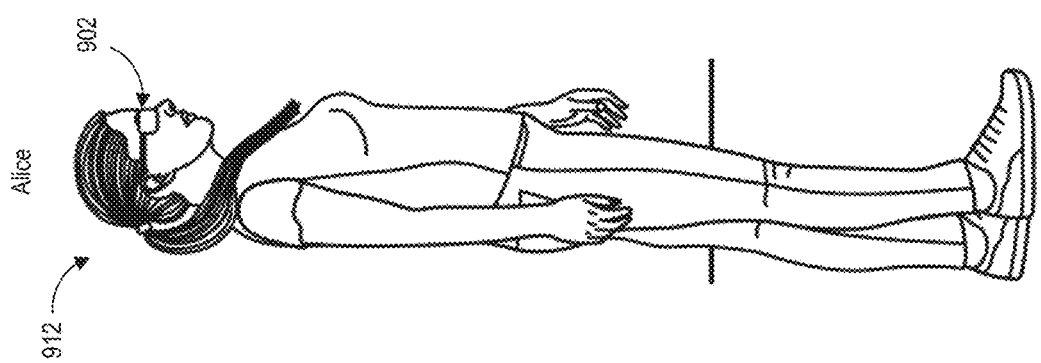
FIG. 9B

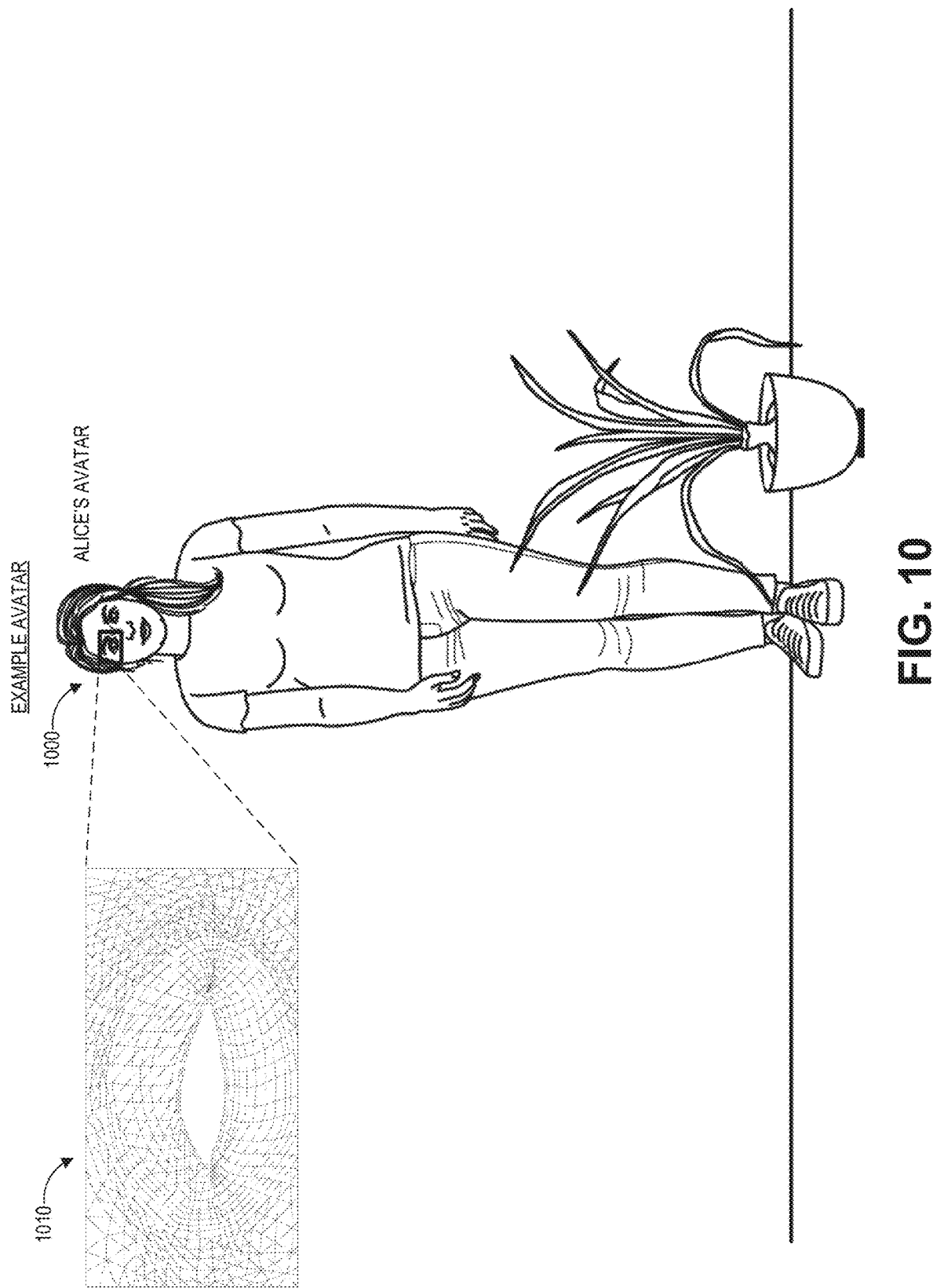

| Spine | Neck | Shoulder | Arms Forward | Arms Up | Arms Horizontal | Arms Twisted | Elbow | Wrist | Knee | Leg | Ankle | Validation | Neutral |
|---|---|---|---|---|---|---|---|---|---|---|---|---|---|
| Spine back | Neck back | Shoulder back 30° | Arm back 40° | Arm down | Arm horizontal back 40° | Arm twist negative | Elbow back 10° | Wrist down 60° | Knee forward 10° | Leg back | Ankle in 45° | Chicken wing pose | Neutral |
| Spine forward | Neck forward | Shoulder forward 30° | Arm forward 90° | Arm up 45° | Arm horizontal forward 90° | Arm twist positive | Elbow forward 45° | Wrist in 30° | Knee back 45° | Leg forward | Ankle out 45° | Hunch pose | Neutral, relaxed |
| Spine forward 180° | Neck slid back | Shoulder up 50° | Arm forward 90°, reaching | Arm up 70° | Arm horizontal 90°, arm 10° | Arm twist negative, up 70° | Elbow forward 90° | Wrist out 40° | Knee back 90° | Leg forward, knee back 135° | Ankle toe raise | Popeye pose | |
| Spine tilt negative | Neck slid forward | | Arm forward 180° | Arm up 100° | Arm horizontal forward 130° | Arm twist positive, up 70° | Elbow forward 125° | Wrist twist negative | Knee back 135° | Leg in | Ankle toe tip | Self-hug pose | |
| Spine tilt positive | Neck tilt negative | | | Arm up 180°, reaching | | Arm medial back 90° | | Wrist twist positive | | Leg out | | Stance pose | |
| Spine twist negative | Neck tilt positive | | | | | | | Wrist up 90° | | Leg out, up | | | |
| Spine twist positive | Neck twist negative | | | | | | | | | Leg twist negative | | | |
| | Neck twist positive | | | | | | | | | Leg twist positive | | | |

USING THREE-DIMENSIONAL SCANS OF A PHYSICAL SUBJECT TO DETERMINE POSITIONS AND/OR ORIENTATIONS OF SKELETAL JOINTS IN THE RIGGING FOR A VIRTUAL CHARACTER

INCORPORATION BY REFERENCE TO ANY PRIORITY APPLICATIONS

This application is a continuation of U.S. patent application Ser. No. 16/400,910, filed May 1, 2019, and entitled "USING THREE-DIMENSIONAL SCANS OF A PHYSICAL SUBJECT TO DETERMINE POSITIONS AND/OR ORIENTATIONS OF SKELETAL JOINTS IN THE RIGGING FOR A VIRTUAL CHARACTER," which claims priority to U.S. Provisional Patent Application No. 62/666,321, filed May 3, 2018, and entitled "USING THREE-DIMENSIONAL SCANS OF A PHYSICAL SUBJECT TO DETERMINE POSITIONS AND/OR ORIENTATIONS OF SKELETAL JOINTS IN THE RIGGING FOR A VIRTUAL CHARACTER." Any and all applications for which a foreign or domestic priority claim is identified above and/or in the Application Data Sheet as filed with the present application are hereby incorporated by reference under 37 CFR 1.57.

FIELD

The present disclosure relates to virtual reality and augmented reality, including mixed reality, imaging and visualization systems and more particularly to rigging systems and methods for animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

In some embodiments, a method comprises: segmenting a polygon mesh of a digital character into a plurality of articulation segments; determining an indicator of position or orientation for each of the articulation segments of the polygon mesh; and transforming one or more joints of a skeleton associated with the polygon mesh based on a transform of the indicator of position or orientation for each of the articulation segments to move the polygon mesh from a first pose to a second pose.

In some embodiments, a system comprises: non-transitory computer storage configured to store a polygon mesh; and a hardware processor in communication with the non-transitory computer storage, the hardware processor programmed to: segment the polygon mesh of a digital character into a plurality of articulation segments; determine an indicator of position or orientation for each of the articulation segments of the polygon mesh; and transform one or more joints of a skeleton associated with the polygon mesh based on a transform of the indicator of position or orientation for each of the articulation segments to move the polygon mesh from a first pose to a second pose.

In some embodiments, a non-transitory computer-readable medium includes instructions which, when read by a computer, cause the computer to perform a method comprising: segmenting a polygon mesh of a digital character into a plurality of articulation segments; determining an indicator of position or orientation for each of the articulation segments of the polygon mesh; and transforming one or more joints of a skeleton associated with the polygon mesh based on a transform of the indicator of position or orientation for each of the articulation segments to move the polygon mesh from a first pose to a second pose.

In some embodiments, a method comprises: determining at least one articulation segment of a polygon mesh, the articulation segment comprising a subset of vertices in the polygon mesh; determining an indicator of the position or orientation of the articulation segment of the polygon mesh; and determining, based on the indicator of the position or orientation of the articulation segment, the position or orientation of at least one joint for deforming the polygon mesh.

In some embodiments, a system comprises: non-transitory computer storage configured to store a polygon mesh; and a hardware processor in communication with the non-transitory computer storage, the hardware processor programmed to: determine at least one articulation segment of the polygon mesh, the articulation segment comprising a subset of vertices in the polygon mesh; determine an indicator of the position or orientation of the articulation segment of the polygon mesh; and determine, based on the indicator of the position or orientation of the articulation segment, the position or orientation of at least one joint for deforming the polygon mesh.

In some embodiments, a non-transitory computer-readable medium comprises instructions which, when read by a computer, cause the computer to perform a method comprising: determining at least one articulation segment of a polygon mesh, the articulation segment comprising a subset of vertices in the polygon mesh; determining an indicator of the position or orientation of the articulation segment of the polygon mesh; and determining, based on the indicator of the position or orientation of the articulation segment, the position or orientation of at least one joint for deforming the polygon mesh.

In some embodiments, a method comprises: automatically fitting a skeleton to a digital scan of a human in a second pose by converting the digital scan to a polygon mesh; dividing the polygon mesh into segments; adding a coordinate system to each segment; calculating a transform for each segment when moving from a first pose to the second pose; and moving the skeleton based on the transform for each segment.

In some embodiments, a system comprises: non-transitory computer storage configured to store a polygon mesh; and a hardware processor in communication with the non-transitory computer storage, the hardware processor programmed to: automatically fit a skeleton to a digital scan of a human in a second pose by converting the digital scan to the polygon mesh; divide the polygon mesh into segments; adding a coordinate system to each segment; calculate a transform for each segment when moving from a first pose to the second pose; and move the skeleton based on the transform for each segment.

In some embodiments, a non-transitory computer-readable medium includes instructions which, when read by a computer, cause the computer to perform a method comprising: automatically fitting a skeleton to a digital scan of a human in a second pose by converting the digital scan to a polygon mesh; dividing the polygon mesh into segments; adding a coordinate system to each segment; calculating a transform for each segment when moving from a first pose to the second pose; and moving the skeleton based on the transform for each segment.

In some embodiments, a method of automatically fitting a skeleton to a scan comprises: correlating a skeleton of a digital character to a first, second, and third principal component associated with each of a plurality of articulation segments of a polygon mesh of the digital character.

In some embodiments, a system comprises: non-transitory computer storage configured to store a polygon mesh; and a hardware processor in communication with the non-transitory computer storage, the hardware processor programmed to: correlate a skeleton of a digital character to a first, second, and third principal component associated with each of a plurality of articulation segments of the polygon mesh of the digital character.

In some embodiments, a non-transitory computer-readable medium includes instructions which, when read by a computer, cause the computer to perform a method comprising: correlating a skeleton of a digital character to a first, second, and third principal component associated with each of a plurality of articulation segments of a polygon mesh of the digital character.

In some embodiments, a method comprises: correlating a skeleton of a digital character to the first three principal components of an eigen-decomposition-based principal component analysis associated with each of a plurality of articulation segments of a polygon mesh of the digital character.

In some embodiments, a system comprises: non-transitory computer storage configured to store a polygon mesh; and a hardware processor in communication with the non-transitory computer storage, the hardware processor programmed to: correlate a skeleton of a digital character to the first three principal components of an eigen-decomposition-based principal component analysis associated with each of a plurality of articulation segments of the polygon mesh of the digital character.

In some embodiments, a non-transitory computer-readable medium includes instructions which, when read by a computer, cause the computer to perform a method comprising: correlating a skeleton of a digital character to the first three principal components of an eigen-decomposition-based principal component analysis associated with each of a plurality of articulation segments of a mesh of the digital character.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

FIG. 10 illustrates an example of an avatar as perceived by a user of a wearable system.

FIG. 12 is a table which illustrates an example set of poses for defining a pose space for a human avatar.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

Figure 1:
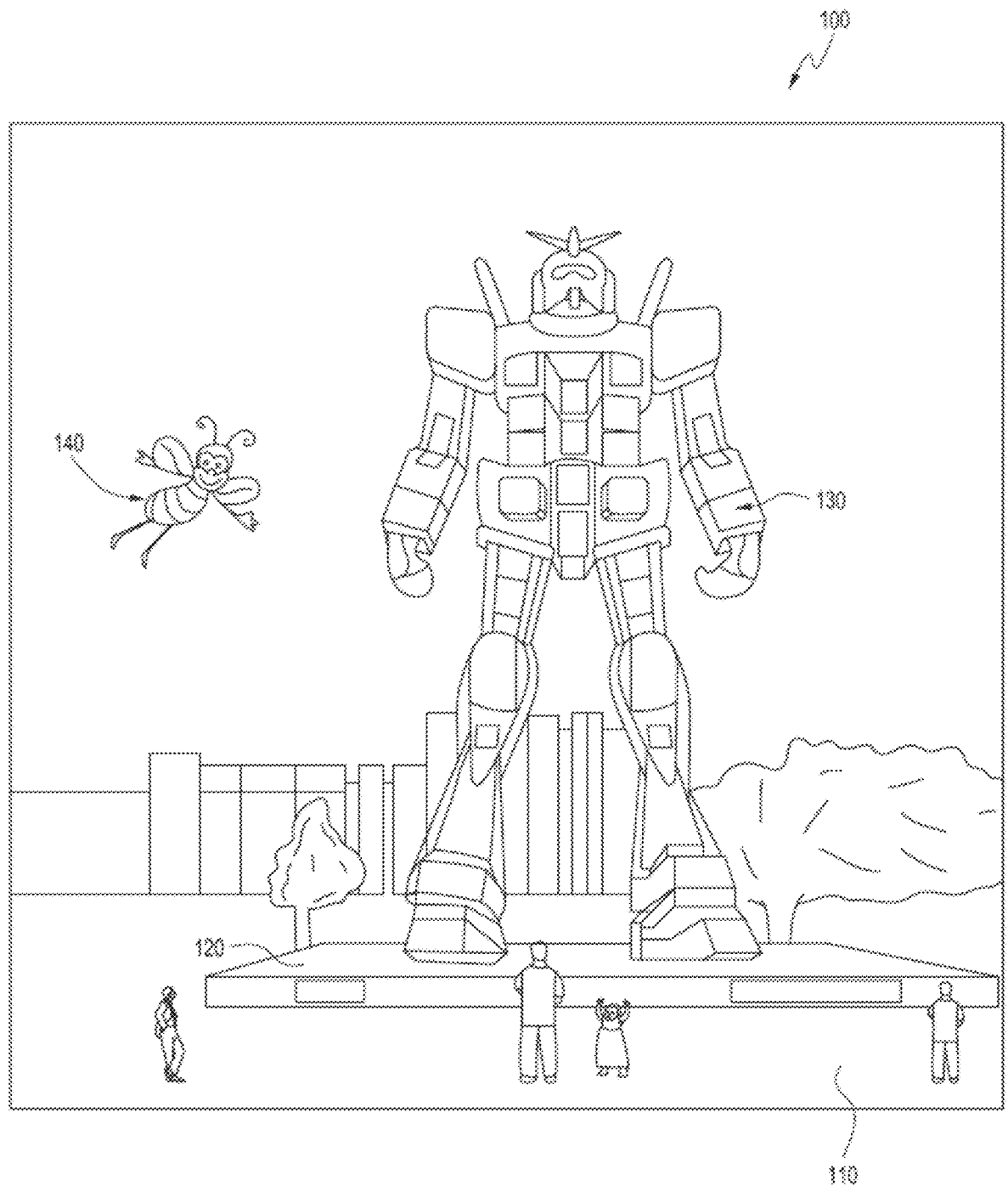
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
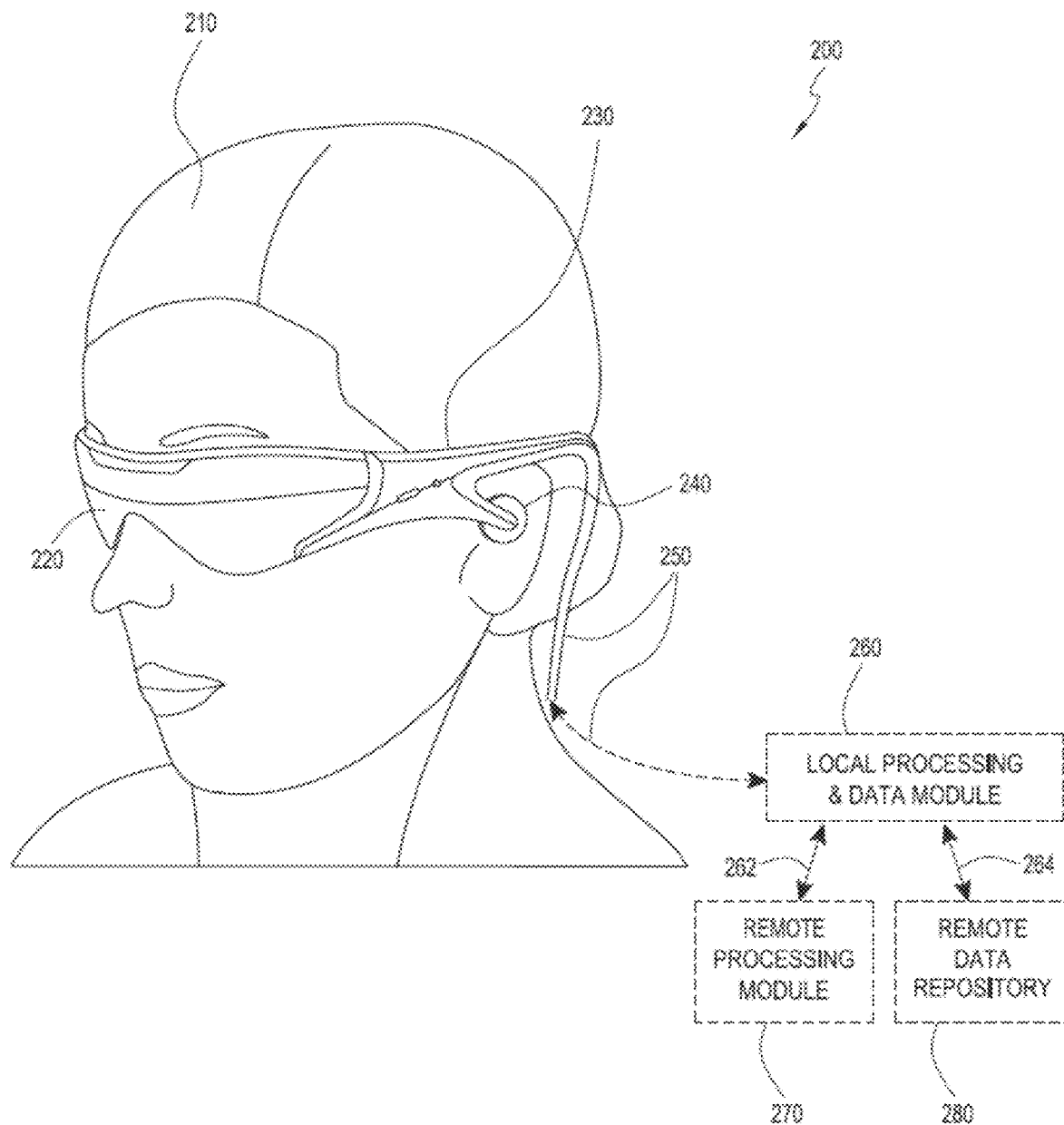
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b)

acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
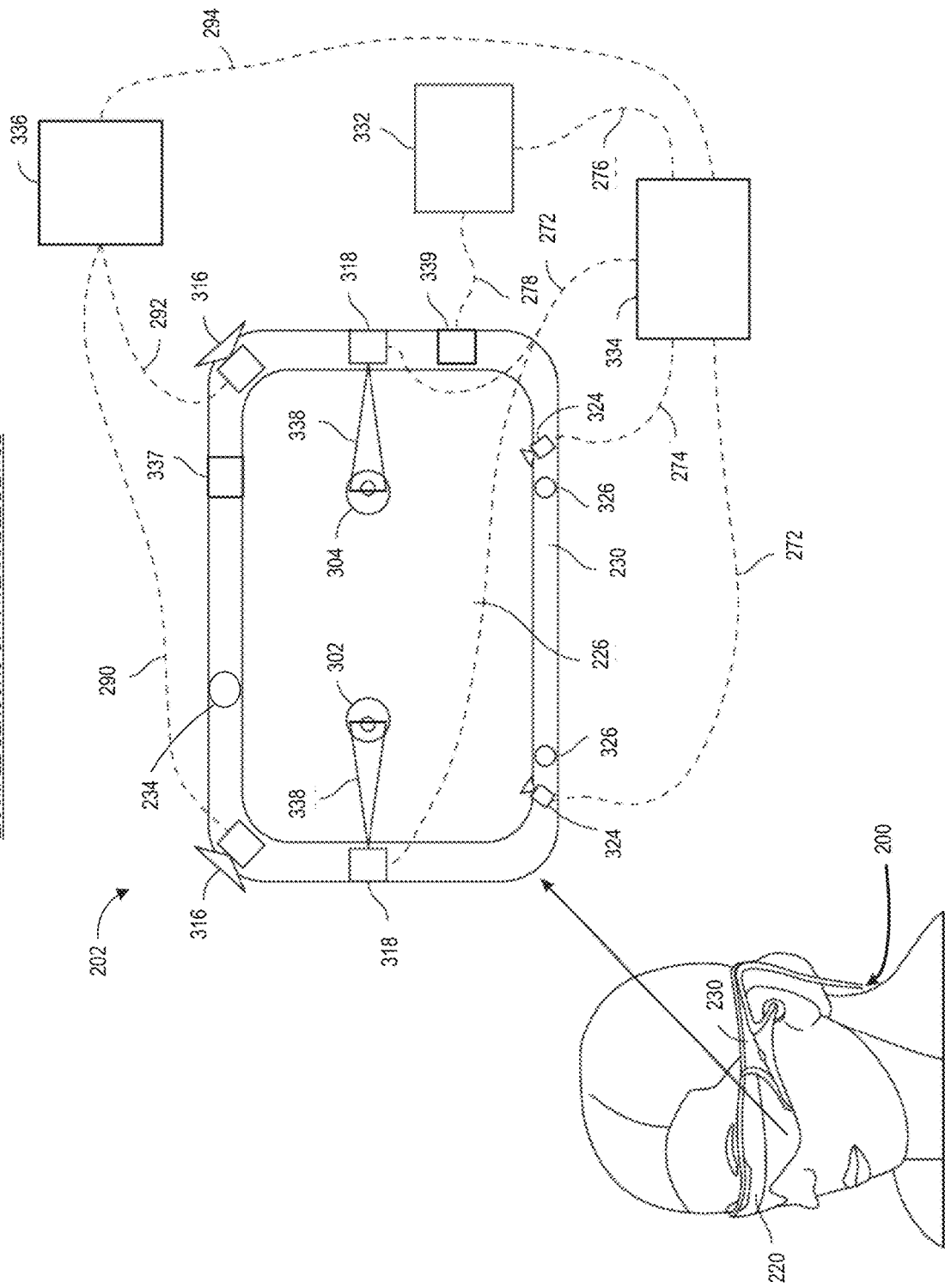
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
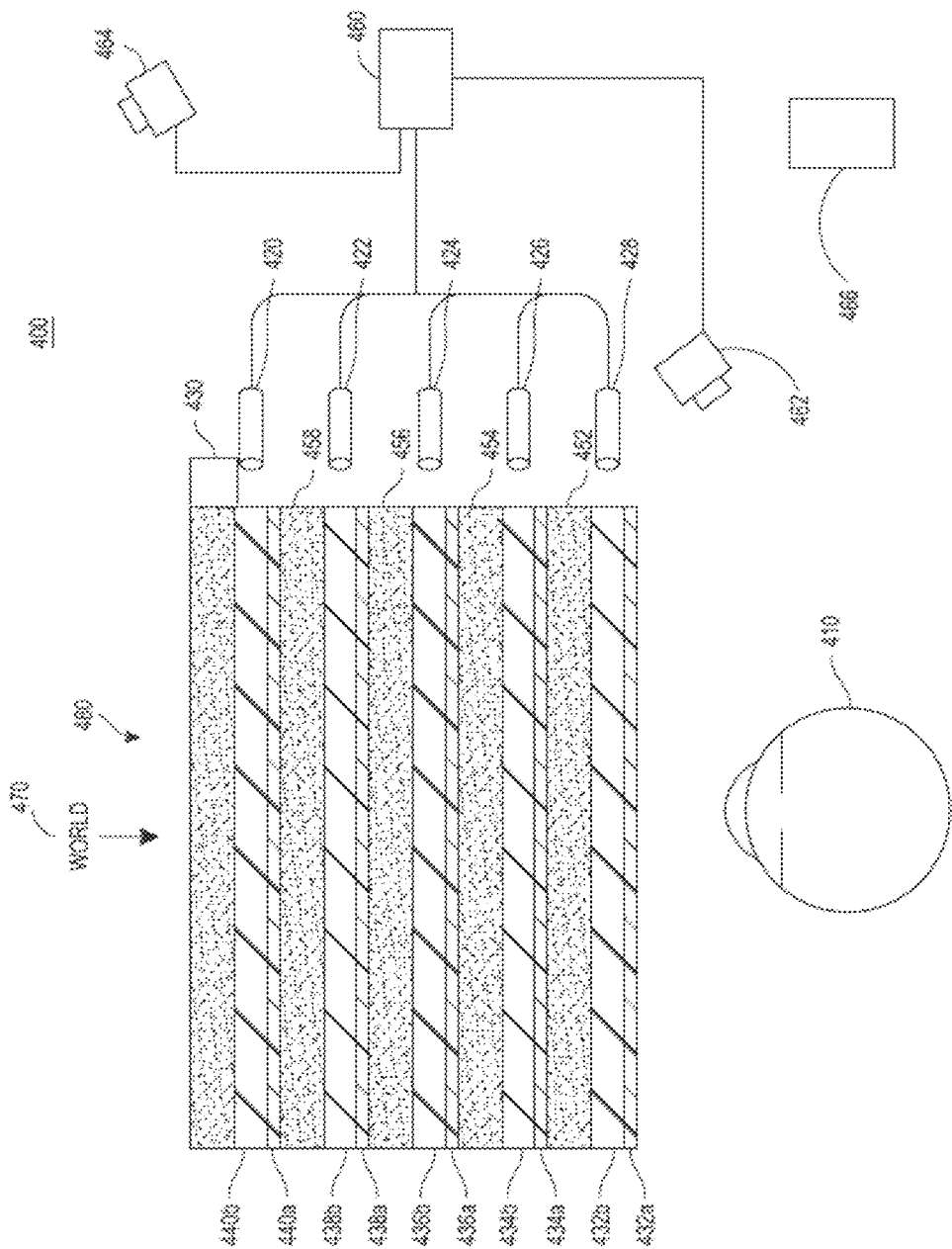
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
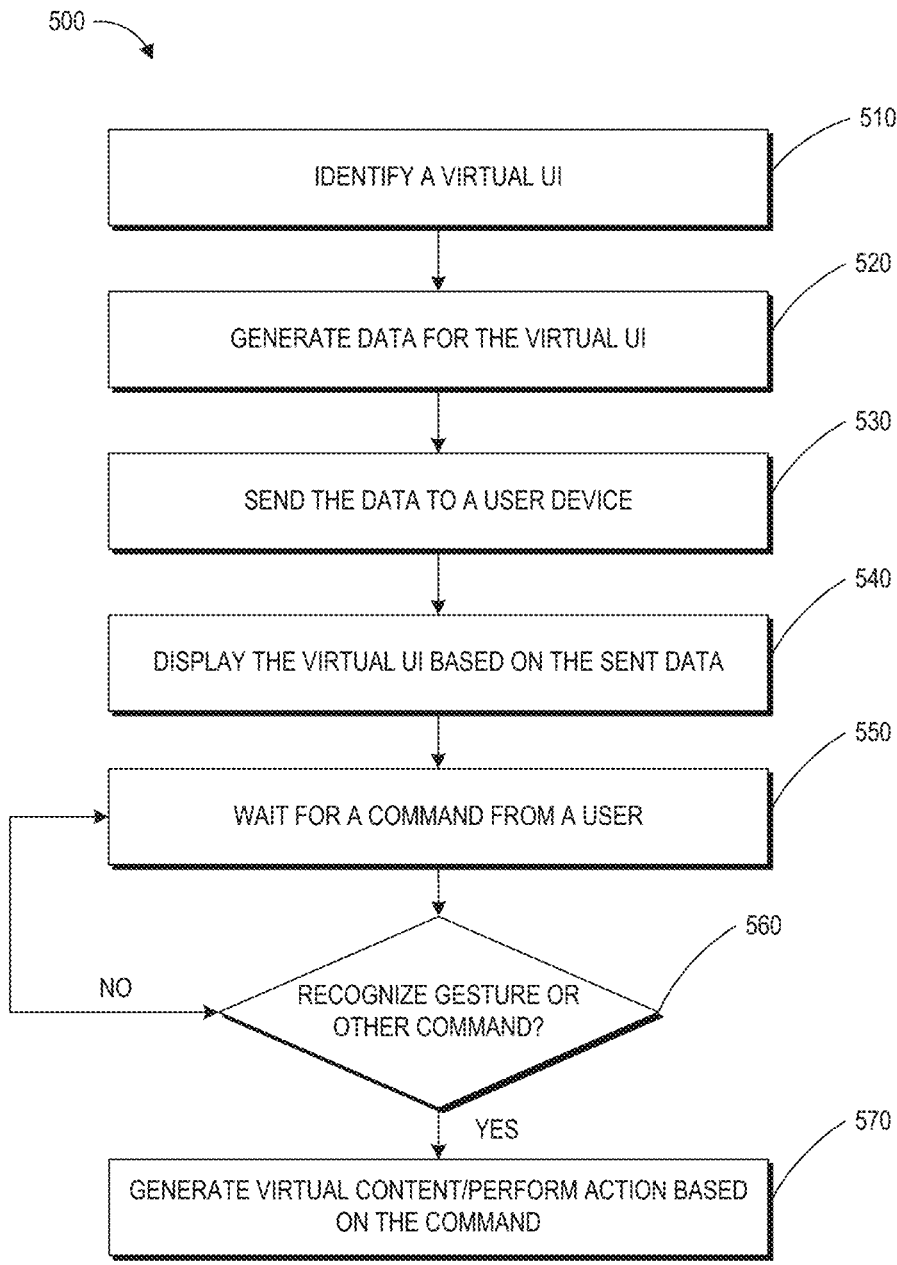
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
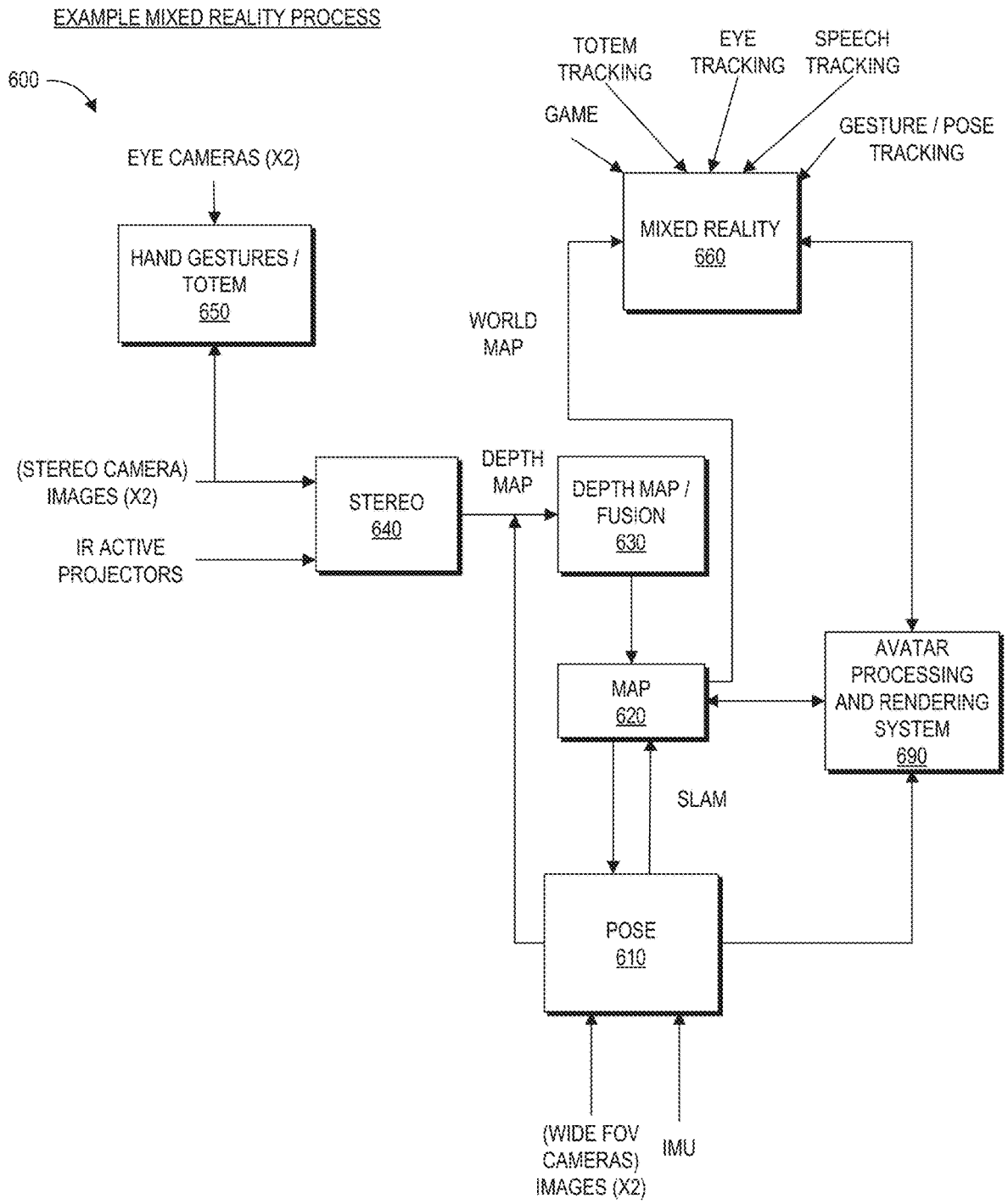
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment.

The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input that can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
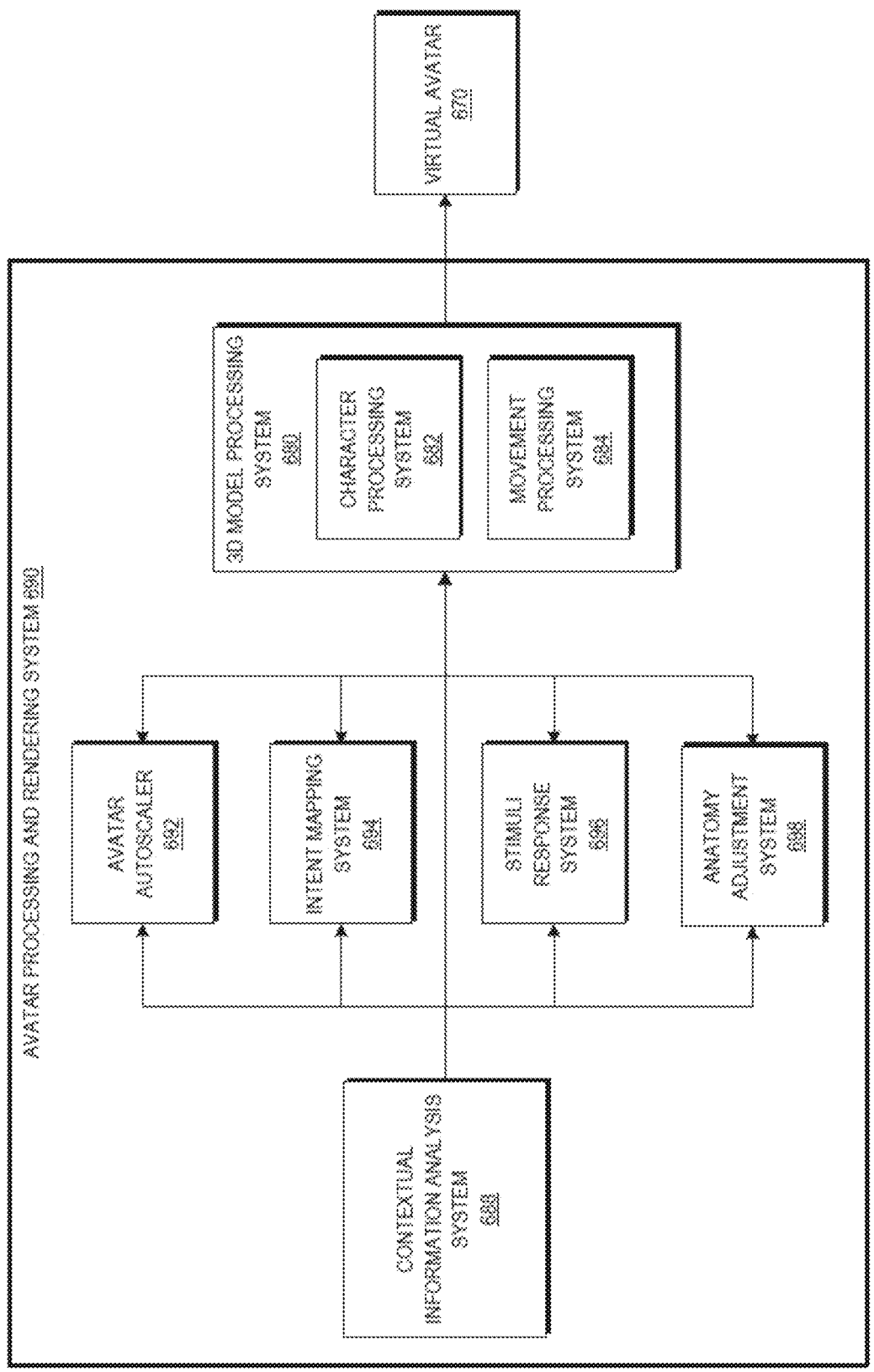
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
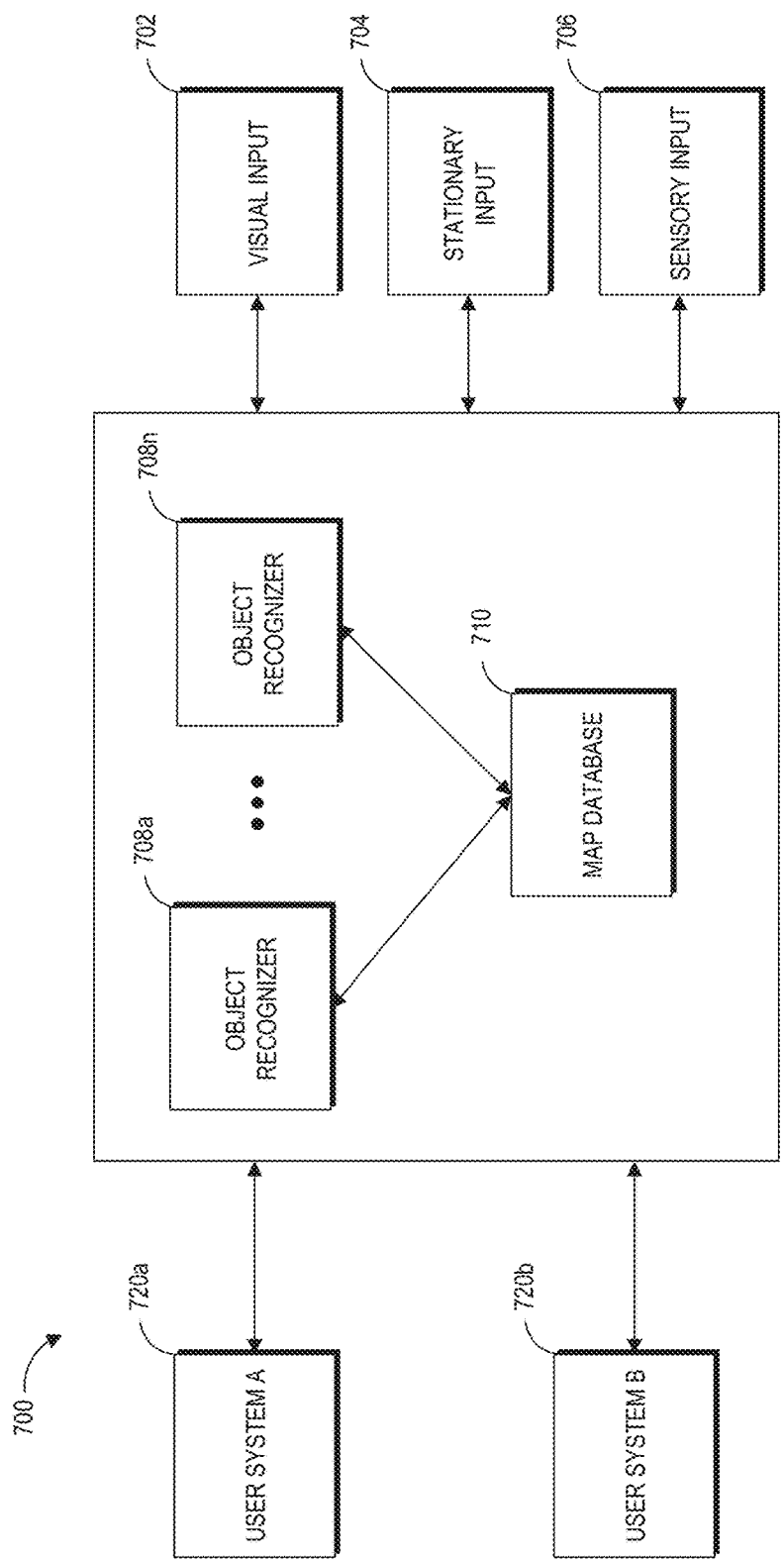
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session, a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
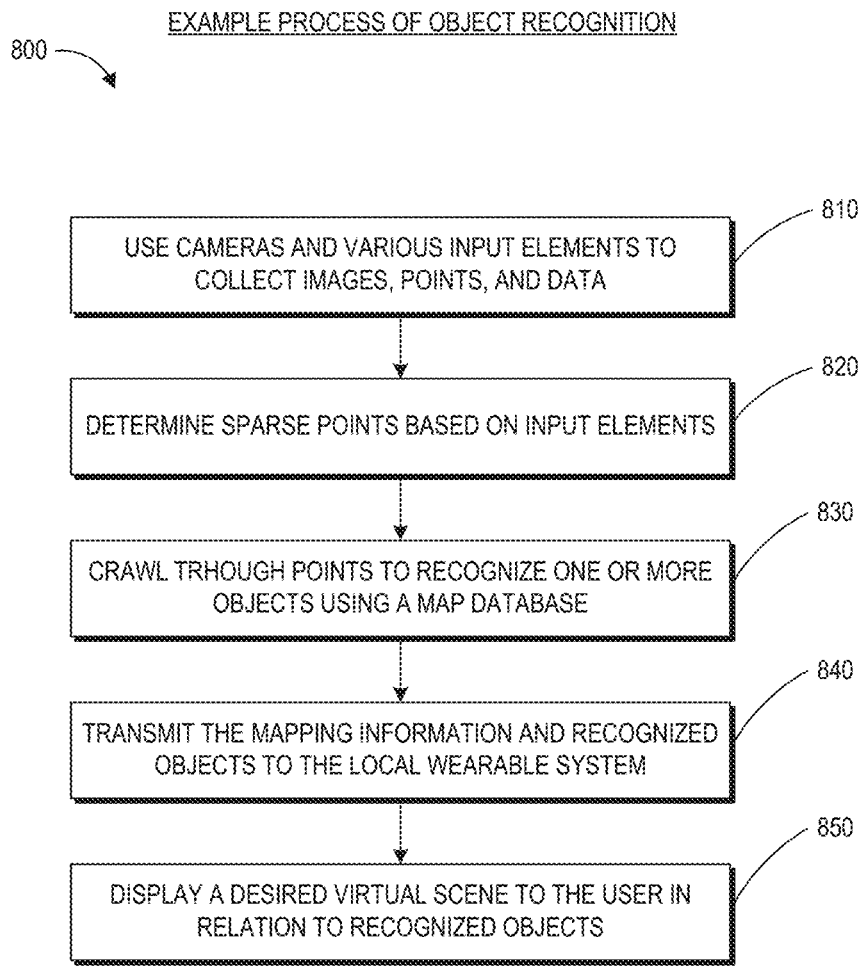
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple
Wearable Systems

Figure 9A:
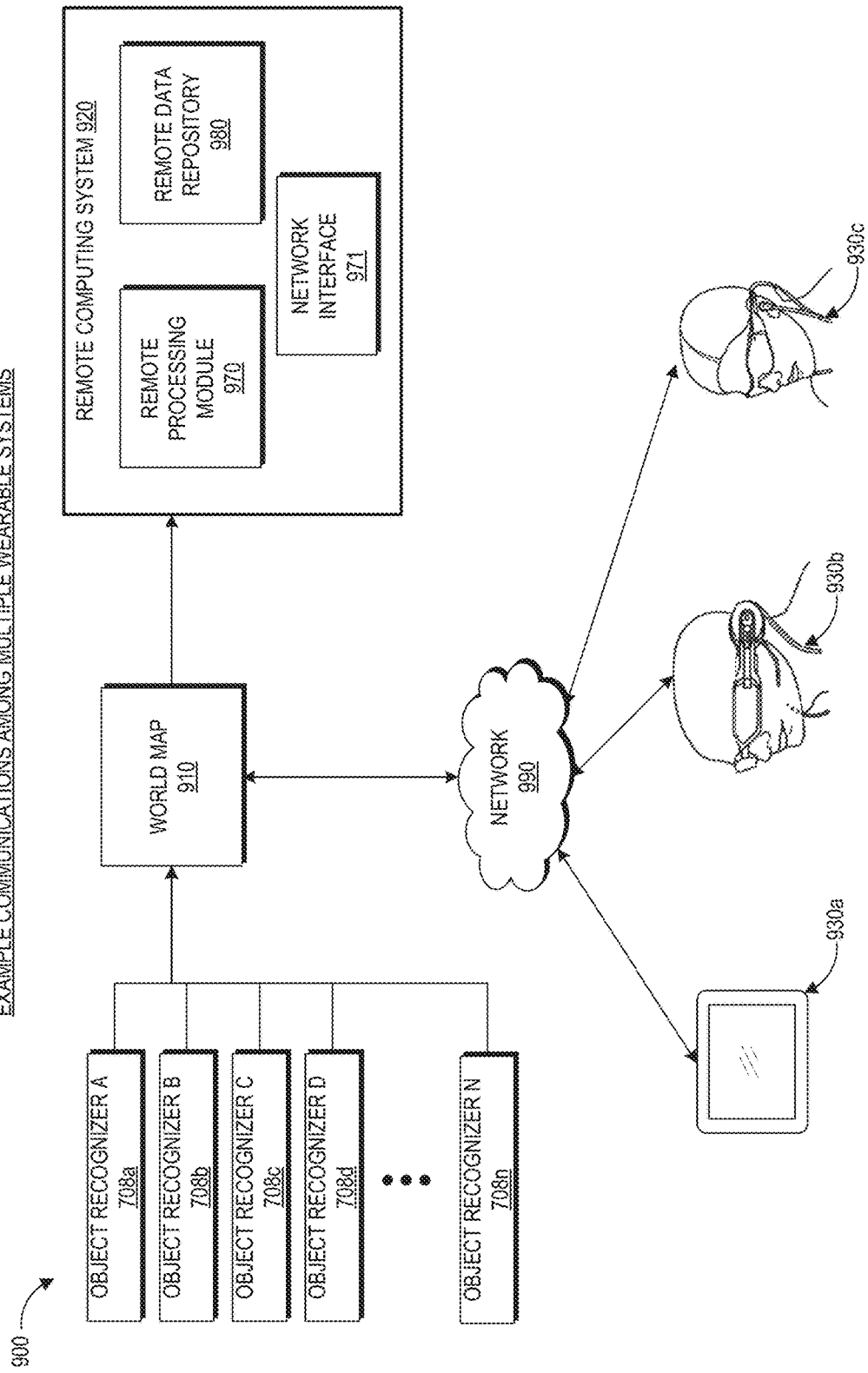
FIG. 9A schematically illustrates an overall system view depicting multiple wearable systems interacting with each other.

FIG. 9A schematically illustrates an overall system view depicting multiple user devices interacting with each other.

The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Example Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may by collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space are various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

One technique which may be used in rigging to assist with mesh deformation is that of skeletal systems. A skeletal system includes a collection of joints which correspond to points of articulation for the mesh. In the context of rigging, joints are sometimes also referred to as "bones" despite the difference between these terms when used in the biological sense. Joints in a skeletal system can move with respect to one another, or otherwise change, according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the mesh points under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the biological skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton; it can represent a wide variety of hierarchies used in the rig to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x,y,z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed to for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, another technique which can be used in rigging to produce mesh deformations is that of "blendshapes." A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way; they offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be quite large.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples.

One problem that can result from applying two blendshapes in combination is that the blendshapes may operate on some of the same vertices in similar ways. When both shapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape. The desired shape from combining two or more blendshapes is known as a combination shape (or simply a "combo").

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBF). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher level components of a rig based upon the state of lower level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system, while making as few compromises to the final quality as possible. In some embodiments, the 3D model processing system 680 executes a rigging system to animate an avatar in a mixed reality environment in real-time to be interactive (with users of the VR/AR/MR system) and to provide appropriate, contextual avatar behavior (e.g., intent-based behavior) in the user's environment.

Using Three-Dimensional Scans of a Physical Subject to Determine Positions and/or Orientations of Skeletal Joints in the Rigging for a Virtual Character As just discussed, the rigging for a virtual character can include many different components, such as a polygon mesh, a core skeleton, higher-order skeletons, blendshapes, and others. These rigging components can be generated manually, but that process can be laborious and susceptible to human error. There is therefore a need for improved techniques for generating rigging components. This particular disclosure describes improved techniques for generating and/or modifying a skeletal system for a virtual character using three-dimensional (3-D) scans of a corresponding physical subject.

A 3-D scan is a set of data which represents a point cloud of spatial samples of the surface(s) of a physical subject. The spatial samples can be given as, for example, xyz coordinates in a three-dimensional Cartesian space. 3-D scans can be generated by a variety of instruments, including laser scanners, structured light scanners, camera systems, etc. 3-D scans provide a wealth of information about the shape of the physical subject being scanned. They can therefore be used to generate a polygon mesh for a virtual character that is based on the physical subject. Furthermore, as described herein, 3-D scans can also be used for specifying the positions and/or orientations of joints, or bones, which make up a skeletal system, such as the core skeleton, in the rigging for the virtual character. If 3-D scans are taken of the physical subject while positioned in different poses, then the positions and/or orientations of the core skeletal joints can likewise be specified for each of the different poses. In this way, the techniques described herein can be used to determine the positions and/or orientations of the core skeletal joints in each of a set of poses which collectively make up a pose space used for implementing a pose space deformer for the virtual character.

Figure 11A:
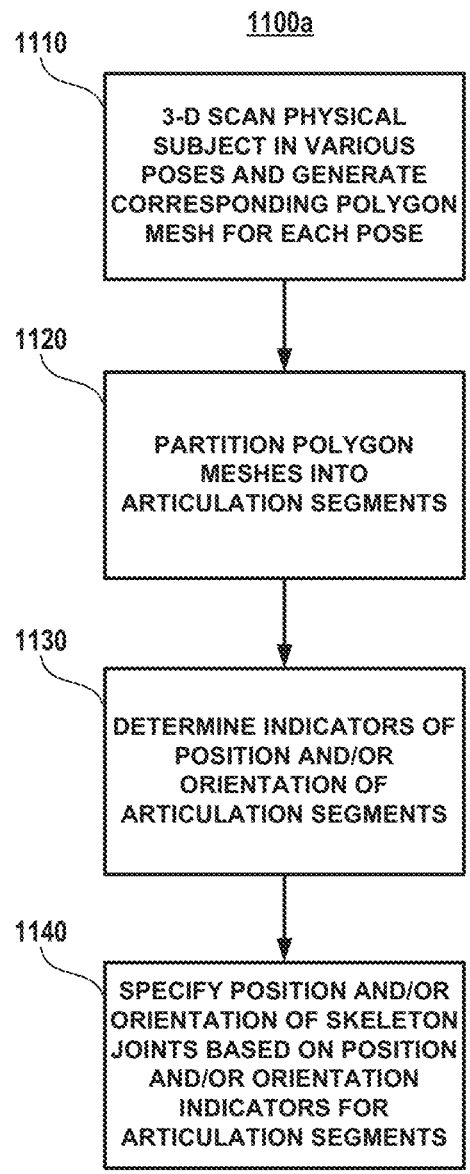
FIGS. 11A-11C are flowcharts which illustrate example methods for determining the positions and/or orientations of skeletal joints in the rigging of a virtual character based on 3-D scans of a physical subject.
Figure 11B:
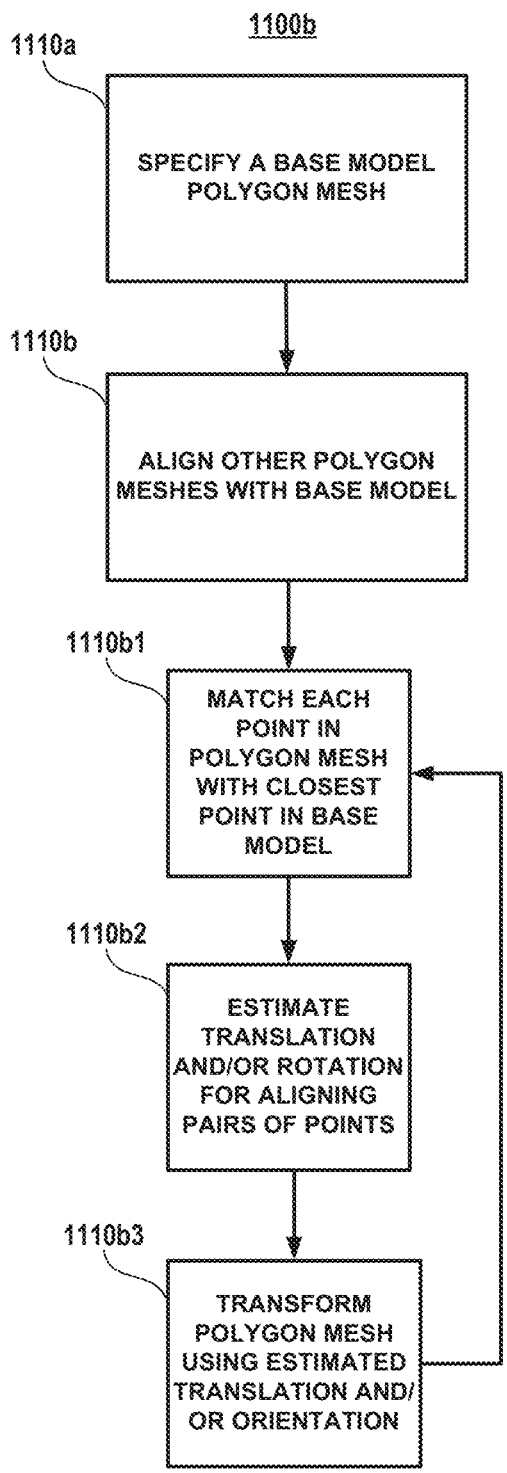
Figure 11C:
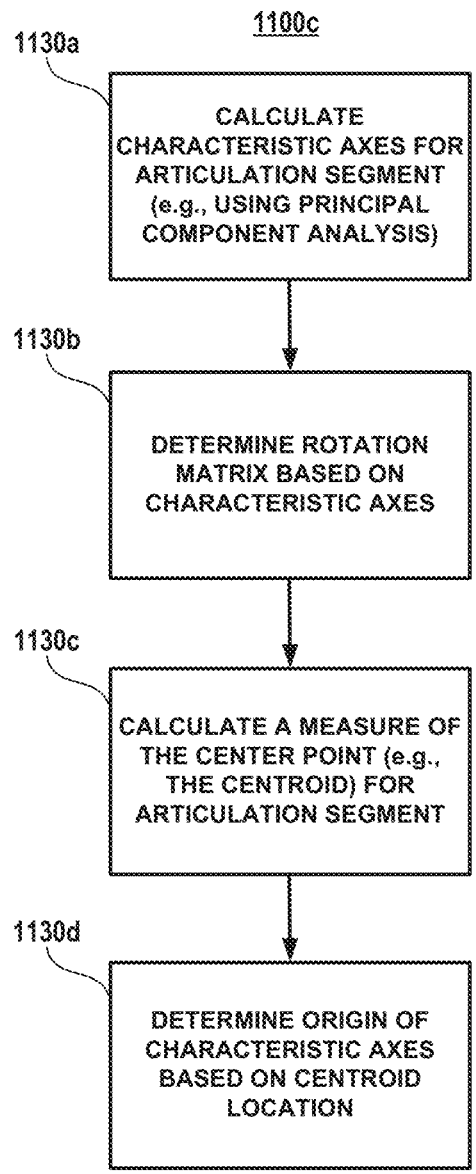

FIGS. 11A-11C are flowcharts which illustrate example methods for determining the positions and/or orientations of skeletal joints in the rigging of a virtual character based on 3-D scans of a physical subject. These methods can be performed by, for example, a computer system with a hardware processor running a digital content creation (DCC) application, such as Autodesk Maya®. While the methods illustrated in FIGS. 11A-11C are largely described and illustrated in the context of using 3-D scans of a human model to determine the positions and/or orientations of core skeletal joints for the rigging of a human avatar, the same techniques can be used for other physical subjects and virtual characters, as well. For example, 3-D scans of other living or inanimate physical subjects, such as animals, statues, figurines, etc., can be used to generate or modify a skeletal system for a virtual character.

The method 1100a of FIG. 11A begins at block 1110 where 3-D scans are taken of a physical subject, such as a human model, while positioned in different poses. The physical subject can have various points of articulation. In the case of a human model, the points of articulation can be the anatomical joints, such as the shoulders, elbows, wrists, hips, knees, ankles, spinal joints, and others. In some cases, groups of multiple anatomical joints can be considered as a single point of articulation. Each of the points of articulation can have a range of movement, sometimes including complex motions in multiple planes. Each of the poses for which a 3-D scan is captured can consist of a particular set of articulations of the anatomical joints of the human model.

In some embodiments, a base pose can be defined for the physical subject. In the case of a human model, the base pose can consist of, for example, the human model standing in a neutral, relaxed position with arms by the sides. A 3-D scan can be taken of the physical subject while in the base pose. Additional 3-D scans can be taken of the physical subject with one or more of the points of articulation deviated from the base pose. An example of this is shown in Table 1, where each entry in the table represents a different pose. As shown in Table 1, a series of 3-D scans are taken of the subject with a first body part ("Body Part 1") positioned with a series of N different articulations ("Articulation 1," "Articulation 2," . . . "Articulation Ni"). The same can be done for M body parts ("Body Part 2" . . . "Body Part M"), where N and M are positive integers. Each of the body parts can include one or more anatomical joints. In some embodiments, "Articulation 1" through "Articulation N" for each body part can span the complete range of motion of the body part in question. In this way, the 3-D scans can be used to define a pose space for the physical subject. The pose space can be useful as training data for a pose space deformer. Later, when provided with a particular set of skeletal joint transforms (e.g., translations and/or rotations), the pose space deformer can calculate deformations for the character's polygon mesh while in that pose by interpolating between the training poses, as described herein.

TABLE 1

| Body Part 1 | Body Part 2 | ... | Body Part M |
|---|---|---|---|
| Articulation 1 | Articulation 1 | ... | Articulation 1 |
| ... | ... | ... | ... |
| Articulation $N_1$ | Articulation $N_2$ | ... | Articulation $N_M$ |

FIG. 12 is a table 1200 which illustrates an example set of poses for defining a pose space for a human avatar. The table 1200 includes columns for various body parts, including the spine, neck, shoulders, arms, elbows, wrists, knees, legs, and ankles. Each entry in the table 1200 represents a particular pose, such as an articulation of the body part listed at the head of the corresponding column. Some body parts (e.g., the arms) are capable of complex motions in multiple different planes, with multiple different orientations, and/or with rotations about one or more axes. In those cases, the Table 1200 can include separate columns for different motions of a single body part. For example, the table 1200 includes columns for arm articulations with the following orientations or movements: arms forward with palms facing to the sides; arms up with palms facing to the sides; arms horizontal with palms facing down; and arms twisting. The table 1200 also includes entries for the 3-D scans of the human model while in the neutral base pose and other more complex validation poses which can be used to validate the output of the pose space deformer.

In some embodiments, a 3-D scan of the human model can be obtained for each of the poses enumerated in the table 1200. In other embodiments, a different set of poses can be used. Once the 3-D scans are obtained, they can be loaded into a DCC application, which can generate a corresponding polygon mesh for each 3-D scan. The resulting polygon meshes are representative of the human model in each of the respective poses.

FIG. 11B illustrates a method 1100b with additional steps that can be performed as part of block 1110 in FIG. 11A. The method 1100b begins at block 1110a where one of the polygon meshes generated from the 3-D scans is specified as a base model. The base model polygon mesh can be the one that is used as the polygon mesh for the virtual character to be animated and deformed using rigging techniques such as those discussed herein.

Figure 13A:
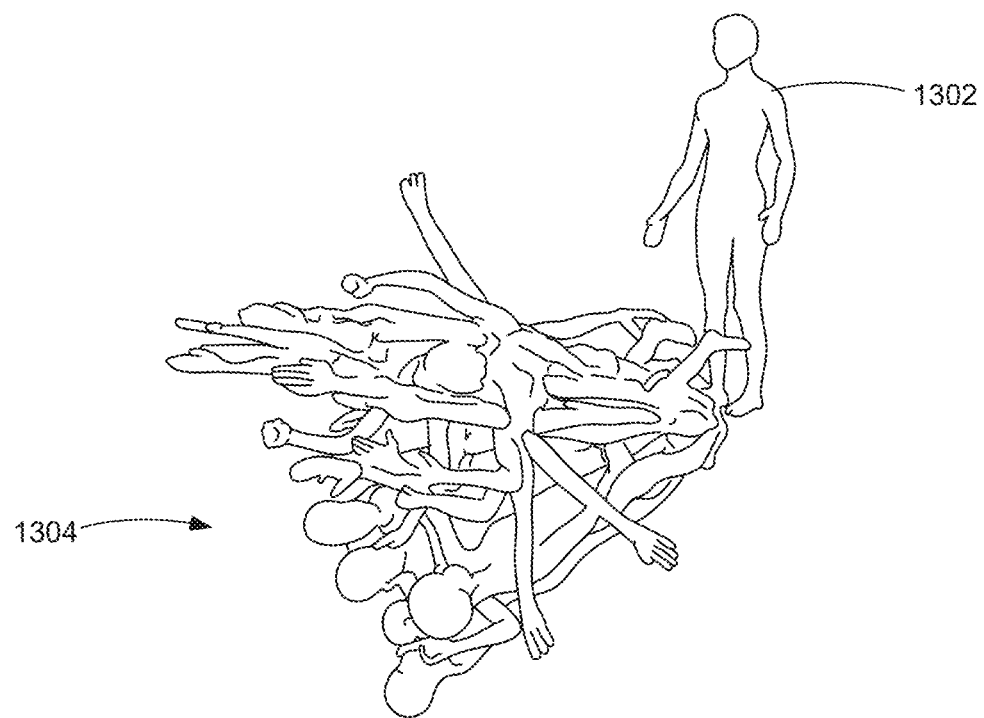
FIG. 13A illustrates an example base model polygon mesh for a human avatar, as well as polygon meshes for other poses.

FIG. 13A illustrates an example base model polygon mesh 1302 for a human avatar, as well as polygon meshes 1304 for other poses. As already mentioned, in the case of a human avatar the base model 1302 can depict the virtual character in a neutral standing position with arms at the sides. This is the base model 1302 shown in FIG. 13A. FIG. 13A also shows the polygon meshes 1304 for some of the other scanned poses listed in the table 1200 shown in FIG. 12. Other base model polygon meshes can be used besides the one (i.e., polygon mesh 1302) shown in FIG. 13A. For example, any of the polygon meshes 1304 could be designated as the base model instead.

In some embodiments, the polygon meshes for each set of articulations of a given body part (e.g., the polygon meshes corresponding to the 3-D scans specified in a given column of the table 1200) are saved to disk as an ordered sequence. The data can be saved as a comma-separated values (CSV) file, though other file types can also be used.

The polygon meshes 1304 shown in FIG. 13A are not aligned to a common reference, so they appear jumbled when plotted together in the same space. Therefore, at block 1110b of the method 1100b shown in FIG. 11B, an alignment operation is performed to align the polygon meshes for all of the different poses to a common reference, such as the base model polygon mesh 1302. This can be performed according to blocks 1110b1-1110b3, which illustrate an iterative closest point algorithm for aligning point clouds.

At block 1110b1, the polygon mesh for one of the poses (e.g., any of the polygon meshes 1304) is selected for alignment with the base model 1302. Each point in the selected polygon mesh is matched with the closest point in the base model. Then, at block 1110b2, the DCC application can be used to estimate the point cloud translation and rotation which best align the matched pairs of points, collectively as a group, according to some metric. For example, the DCC application can determine a translation and rotation of the selected polygon mesh which reduce or minimize the root mean square distance between the matched pairs of points. Other metrics can also be used. At block 1110b3, the selected polygon mesh which is being aligned with the base model 1302 is transformed according to the translation and rotation estimated in block 1110b2. These steps can then be iterated until a desired degree of alignment convergence is realized. The alignment operation can be completed for each of the polygon meshes 1304.

Figure 13B:
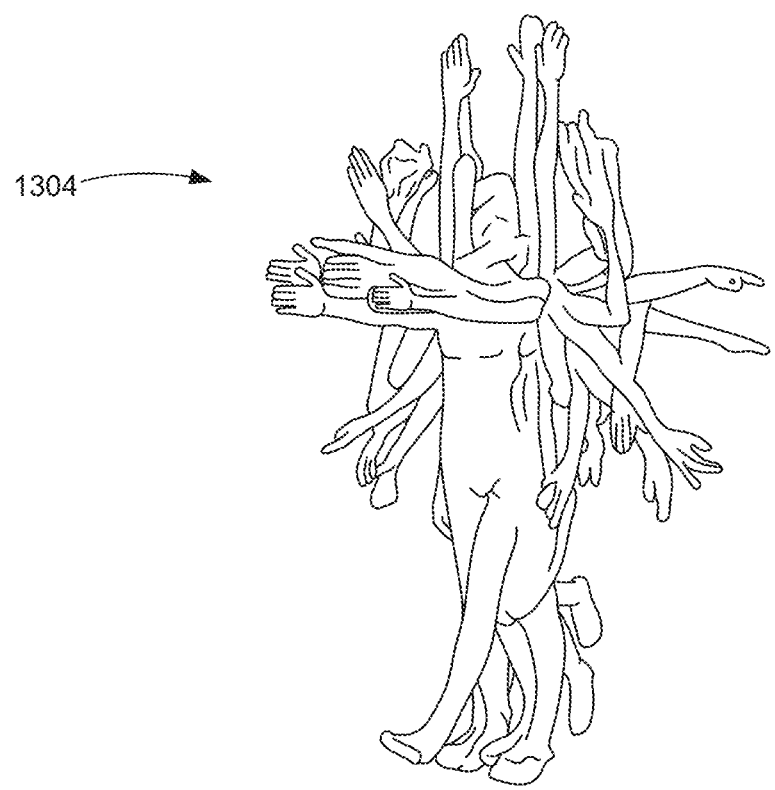
FIG. 13B illustrates the results of alignment of the polygon meshes for the poses shown in FIG. 13A to that of the base model.

FIG. 13B illustrates the results of alignment of the polygon meshes 1304 for the poses shown in FIG. 13A to that of the base model 1302. As illustrated, the alignment operation causes the polygon meshes 1304 of the various poses to substantially coincide with the base model 1302 except where the unique body part articulation in each pose causes it to differ from the base model.

Upon completion of the alignment operation, a motion sequence file can be generated for the body part articulations in each column of the table 1200 shown in FIG. 12. Each of the poses in a motion sequence can represent a keyframe for use in animating the corresponding body part. These motion sequence files can be loaded into the DCC application.

In some embodiments, the DCC application can also be used to manually generate an initial rudimentary core skeleton for the base model polygon mesh of the virtual character. The initial core skeleton can consist of a hierarchical set of core skeletal joints, with each joint having an initial position and/or orientation. In such embodiments, this initial rudimentary core skeleton can then be refined using the techniques described herein.

With reference back to the method 1100a shown in FIG. 11A, at block 1120 the DCC application can partition each of the polygon meshes 1304 into articulation segments. Each of the articulation segments may include a subset of the vertices which make up the complete polygon mesh for the virtual character. An articulation segment can consist essentially of those vertices which pertain to a given body part; or which change position and/or orientation substantially together as a group from one pose to another with articulation of a given anatomical joint or set of anatomical joints by the physical subject. (In practice, articulation segments may include some vertices which, when compared to the articulation segment as a whole, move more, less, or differently than the group for different articulations. In some embodiments, the vertices which make up a given articulation segment can be considered to change position and/or orientation substantially together as a group if at least 70% of the vertices in the articulation segment translate in a particular direction, or rotate about a particular axis, by an amount that is within 50% of the translation and/or rotation of the articulation segment as a whole in that particular direction, or about that particular axis, from one pose to another. In other embodiments, the vertices which make up a given articulation segment can be considered to change position and/or orientation substantially together as a group if at least 85% of the vertices in the articulation segment translate in a particular direction, or rotate about a particular axis, by an amount that is within 30% of the translation and/or rotation of the articulation segment as a whole in that particular direction, or about that particular axis, from one pose to another. In still other embodiments, the vertices which make up a given articulation segment can be considered to change position and/or orientation substantially together as a group if at least 90% of the vertices in the articulation segment translate in a particular direction, or rotate about a particular axis, by an amount that is within 15% of the translation and/or rotation of the articulation segment as a whole in that particular direction, or about that particular axis, from one pose to another.)

Figure 14:
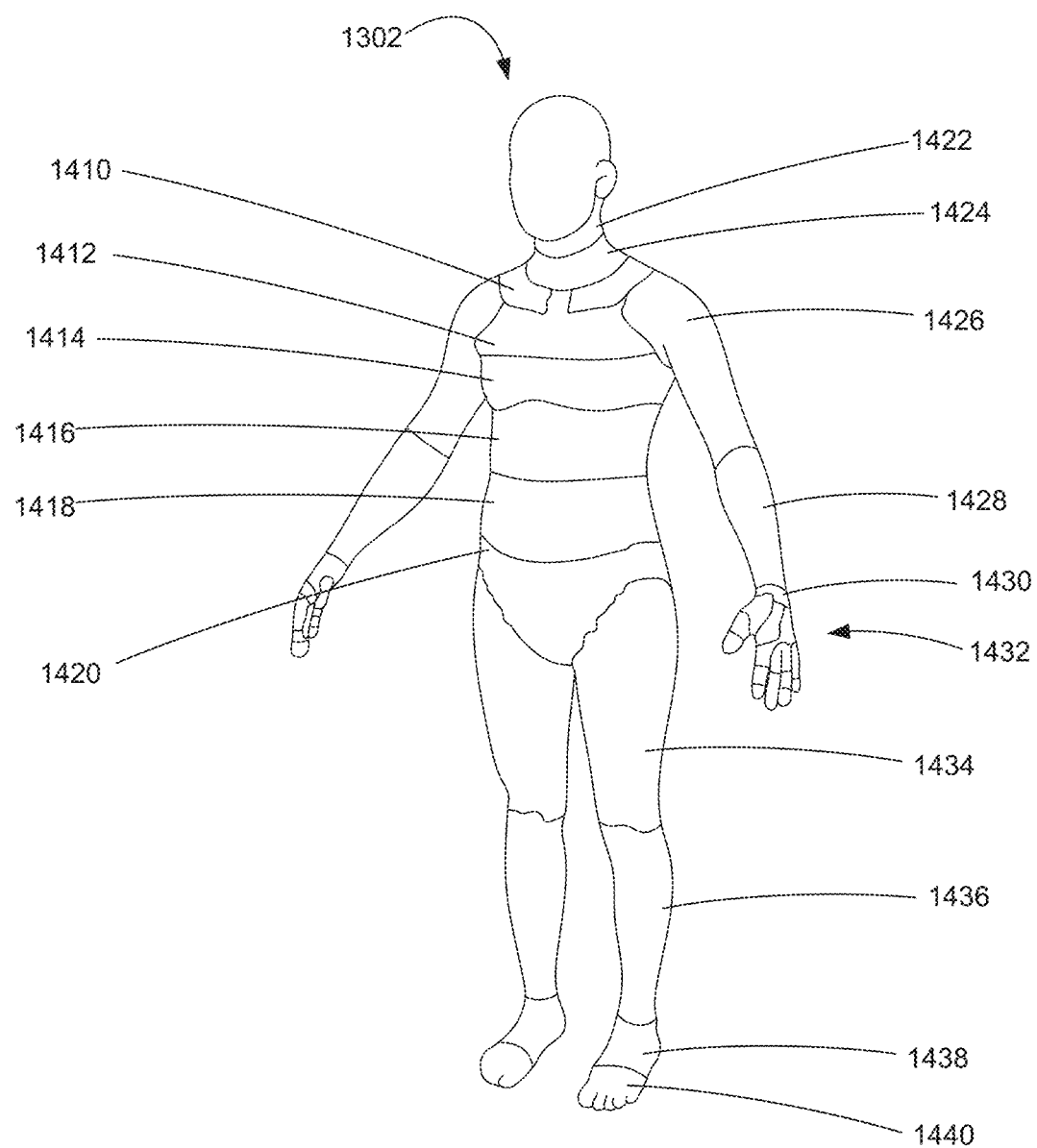
FIG. 14 illustrates a set of example articulation segment mappings for the base model of a human avatar.

FIG. 14 illustrates a set of example articulation segment mappings for the base model 1302 of a human avatar. In the illustrated embodiment, the following articulation segments are provided: left and right clavicle articulation segments (e.g., 1410); an upper chest articulation segment 1412; a lower chest articulation segment 1414; an upper abdomen articulation segment 1416; a lower abdomen articulation segment 1418; a pelvis articulation segment 1420; an upper neck articulation segment 1422; a lower neck articulation segment 1424; left and right upper arm articulation segments (e.g., 1426); left and right lower arm articulation segments (e.g., 1428); left and right wrist articulation segments (e.g., 1430); left and right sets of multiple hand and finger articulation segments (e.g., 1432); left and right upper leg articulation segments (e.g., 1434); left and right lower leg articulation segments (e.g., 1436); left and right ankle and midfoot articulation segments (e.g., 1438); and left and right forefoot articulation segments (e.g., 1440). The illustrated articulation segments are but one example of articulation segment mappings. In other embodiments, different articulation segment mappings can be used, including a greater or lesser number of articulation segments.

While FIG. 14 only illustrates example articulation segment mappings for the base model 1302, the polygon meshes 1304 for each of the poses shown in table 1200 can similarly be partitioned into like articulation segments. In some embodiments, there is a one-to-one correspondence between the articulation segments for each of the polygon meshes 1304 and the joints, and/or bones, in the core skeleton of the virtual character.

Articulation segment mappings can be loaded into the DCC application from one or more files which provide a list of vertex identification numbers pertaining to each articulation segment for each polygon mesh. In other embodiments, articulation segment mappings can be generated using a ray casting technique. According to this technique, an initial rudimentary core skeleton can be manually generated for each of the polygon meshes which illustrate the various poses. Rays can then be projected radially outward from the bones of the core skeleton. Those vertices which define polygon faces that are intersected by the rays can then be assigned to that bone, or joint, of the core skeleton of the virtual character. For example, the hip joints of the human avatar's core skeleton can include bones which are analogous to the femurs. Rays can be projected from each of these bones to determine the respective sets of vertices in a given polygon mesh which correspond to the left and right upper leg articulation segments. This ray casting procedure can be performed for each of the joints, or bones, in the initial rudimentary core skeleton for each of the posed polygon meshes in order to create mappings between subsets of the vertices and the corresponding articulation segments.

At block 1130 of the method 1100a shown in FIG. 11A, position and/or orientation indicators can be determined for each of the articulation segments in each of the polygon meshes. This can be accomplished according to the method 1100c in FIG. 11C, which illustrates steps that can be performed as part of block 1130 in FIG. 11A. The method 1100c begins at block 1130a where the DCC application can calculate characteristic axes for each of the articulation segments. These characteristic axes can define a local coordinate system, with an origin point, for each of the articulation segments. A unique local coordinate system can be determined for each of the articulation segments in each of the polygon meshes for the various poses. The characteristic axes for an articulation segment are an example of an orientation indicator which can be used to specify the orientation of the corresponding core skeletal joint. Meanwhile, the origin of the local coordinate system for an articulation segment is an example of a position indicator which can be used to specify the position of the corresponding core skeletal joint.

The characteristic axes for each articulation segment can be calculated in the following manner. The polygon mesh vertices which make up a given articulation segment can be considered as a set of observations regarding the shape of that articulation segment in 3-D space. Vectors with the xyz coordinates of each vertex in the articulation segment can be grouped into a data matrix, A. Then, the covariance matrix or the correlation matrix of the data matrix A can be calculated using techniques known in the art.

An eigen-decomposition can then be performed on the covariance matrix or the correlation matrix which corresponds to the data matrix A. This eigen-decomposition of the covariance matrix or the correlation matrix gives a set of linearly independent eigenvectors. These eigenvectors (which can be normalized to unit length) are sometimes referred to as the principal components of the data, and this analysis is sometimes referred to as Principal Component Analysis. The principal components can also be calculated with other techniques, such as Singular Value Decomposition.

Each principal component that is calculated from the vertices which make up a given articulation segment is an example of a characteristic axis of that articulation segment. The principal components serve as linearly independent basis vectors, such that the locations of all the vertices in the articulation segment can be expressed as linear combinations of the principal components.

The first principal component points in the direction of greatest variance in the locations of the vertices of the articulation segment. The second principal component is orthogonal to the first principal component and points in the direction of greatest variance in the locations of the vertices of the articulation segment, subject to the orthogonality constraint with the first principal component. Finally, the third principal component is orthogonal to the first principal component and the second principal component. Each of the principal components also has an eigenvalue which is indicative of the amount of variation in the original data that occurs in the direction of the associated eigenvector. The principal components can be used to specify a new local coordinate system for the polygon mesh vertices of an articulation segment.

Figure 15A:
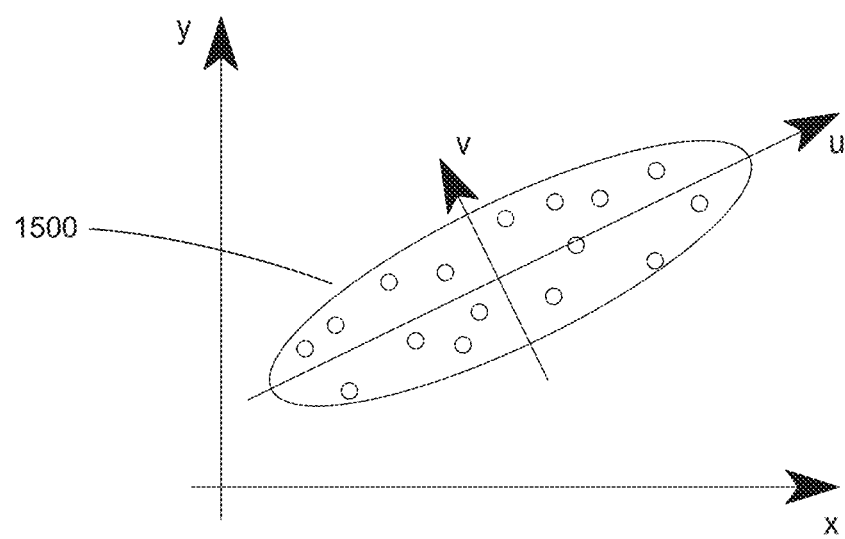
FIG. 15A illustrates an example set of characteristic axes for a 2-D point cloud.

FIG. 15A illustrates an example set of characteristic axes for a two-dimensional (2-D) point cloud. In the case of the two-dimensional data points illustrated by circles in FIG. 15A, Principal Component Analysis can be understood as fitting an ellipse 1500 to the data points, where the major and minor axes of the ellipse of best fit are the principal components of the data. The major axis, u, of the ellipse 1500 is the first principal component. The amount of variation in the locations of the data points is greatest in the direction of the major axis, u, of the ellipse 1500. This means that the first principal component points in the direction of greatest variance in the data set. Meanwhile, the minor axis, v, of the ellipse 1500 is the second principal component. The second principal component is constrained to be orthogonal to the first principal component. The variance in the data set in the direction of the second principal component is less than that in the direction of the first principal component. This concept of an ellipse of best fit can be extended to three-dimensional data, such as a point cloud of vertices which make up an articulation segment, as an ellipsoid of best fit.

Figure 15B:
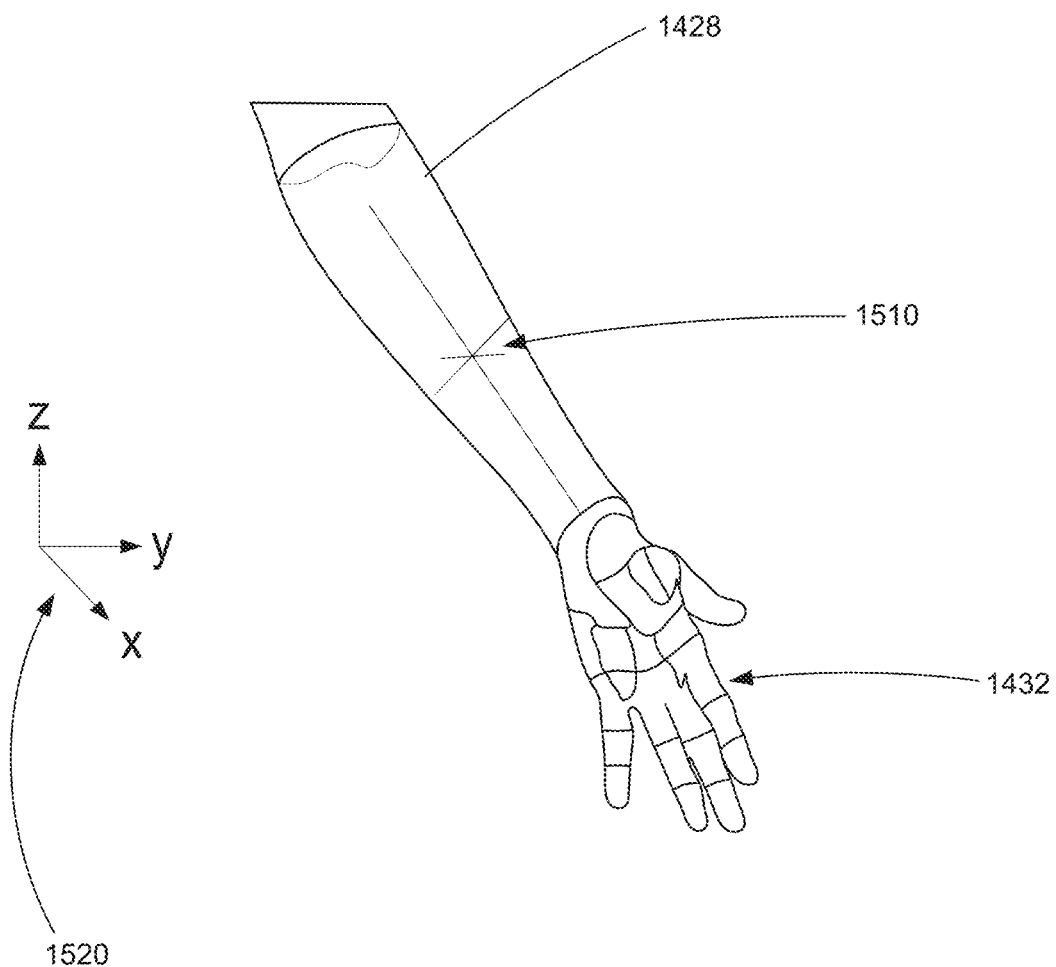
FIG. 15B illustrates an example 3-D set of characteristic axes for a lower arm articulation segment of a polygon mesh.

FIG. 15B illustrates an example 3-D set of characteristic axes 1510 for a lower arm articulation segment 1428 of a polygon mesh. In this example, the characteristic axes 1510 were calculated as the principal components of the set of polygon mesh vertices which make up the lower arm articulation segment 1428. The first principal component is the longest of the illustrated characteristic axes and, in this example, extends along the longitudinal axis of the lower arm articulation segment 1428. The first principal component points in this direction because that is the direction in which there is the greatest degree of variance in the locations of the vertices which make up the lower arm articulation segment 1428. Meanwhile, the second longest characteristic axis corresponds to the second principal component and the third longest characteristic axis corresponds to the third principal component.

The characteristic axes 1510 of the lower arm articulation segment 1428 can be used to define a local coordinate system for that particular articulation segment in the illustrated pose. This local coordinate system can be compared to a reference coordinate system 1520. Then, at block 1130b of the method 1100c in FIG. 11C, a rotation matrix that aligns the reference coordinate system 1520 to the local coordinate system, or vice versa, can be determined. In some embodiments, the reference coordinate system 1520 can be the same for all of the articulation segments. In other embodiments, a different reference coordinate system can be used for each of the articulation segments. For example, the reference coordinate system 1520 for a particular articulation segment can correspond to the characteristic axes for that articulation segment in the base pose polygon mesh. In those embodiments, the reference coordinate system 1520 will include first, second, and third principal components. And the rotation matrix can specify the rotation necessary to align the first principal component of the reference coordinate system 1520 to the first principal component of the local coordinate system 1510, and so on for the respective second and third principal components. In any case, the rotation matrix for a given articulation segment in a given polygon mesh is indicative of the rotation transform that is applied to the corresponding core skeletal joint for that particular articulation segment in the pose represented by that particular polygon mesh.

The same procedure which was used to determine the characteristic axes of the lower arm articulation segment 1428 in FIG. 15B can also be used to calculate a set of characteristic axes for all of the other articulation segments of the polygon meshes for all of the poses shown in the table 1200 in FIG. 12. In this way, the orientations of all of the core skeletal joints for all of the poses can be determined based on the 3-D scans.

At block 1130c of the method 1100c shown in FIG. 11C, a measure of the center point for each articulation segment of each polygon mesh can be calculated. In some embodiments, the measure of the center point is the centroid of the articulation segment in question. The centroid for each articulation segment can be calculated as the mean position of all the polygon mesh vertices which make up that articulation segment. As discussed further below, in some embodiments, a centroid location for an articulation segment can be used as the origin of a set of characteristic axes for that articulation segment.

At block 1130d of the method 1100c shown in FIG. 11C, the centroid location for each articulation segment can be used as the origin for the local coordinate system whose basis vectors are defined by the characteristic axes for that articulation segment. Centroid values can be calculated for all of the articulation segments of the polygon meshes for all of the poses shown in the table 1200 in FIG. 12. The centroid value for each articulation segment in each pose can be used to determine the position of the corresponding core skeletal joint in each pose. In this way, the positions of all of the core skeletal joints for all of the poses can be determined based on the 3-D scans.

Now with reference back to the method 1100a shown in FIG. 11A, at block 1140 the position and/or orientation indicators for the articulation segments can be used to specify the positions and/or orientations of the corresponding core skeletal joints. For example, the rotation transform for each of the core skeletal joints in each of the poses can be the rotation matrix that was calculated for the corresponding articulation segment in the corresponding pose. Similarly, the translation transform for each of the core skeletal joints in each of the poses can be determined from the centroid value that was calculated for the corresponding articulation segment in the corresponding pose. For example, since the core skeletal joint which corresponds to a particular articulation segment will typically not be located in the middle of that articulation segment, the translation transform for each core skeletal joint can be specified such that the midpoint of the bone lies at the location of the centroid value for the corresponding articulation segment in the corresponding pose.

In some embodiments, the position and/or orientation indicators for a set of articulation segments can be used to find a best fit—according to selected criteria—of the core skeletal joints to the corresponding polygon mesh. In this process, the beginning positions and/or orientations of the joints can be set according to a statistically-average core skeleton for the pose represented by the polygon mesh. The positions and/or orientations of the core skeletal joints can then be modified using the position and/or orientation indicators for the corresponding articulation segments. This process can begin with the root joint, or top of the hierarchical set of joints which make up the core skeleton. The position and/or orientation of the root joint can be set according to the position and/or orientation indicators for its corresponding articulation segment. The position and/or orientation of the next lower joint in the hierarchy can then be adjusted using the position and/or orientation indicators for the articulation segment which corresponds to that joint. In some embodiments, however, this is subject to a constraint which can be imposed to maintain the Euclidian distance between the current joint and the preceding joint in the skeletal hierarchy. (This constraint can be imposed in recognition of the fact that anatomical joints are generally joined by an anatomical bone which maintains a fixed distance between the joints.) This process can be completed down through the skeletal hierarchy until the positions and/or orientations of all the skeletal joints have been determined.

Figure 16:
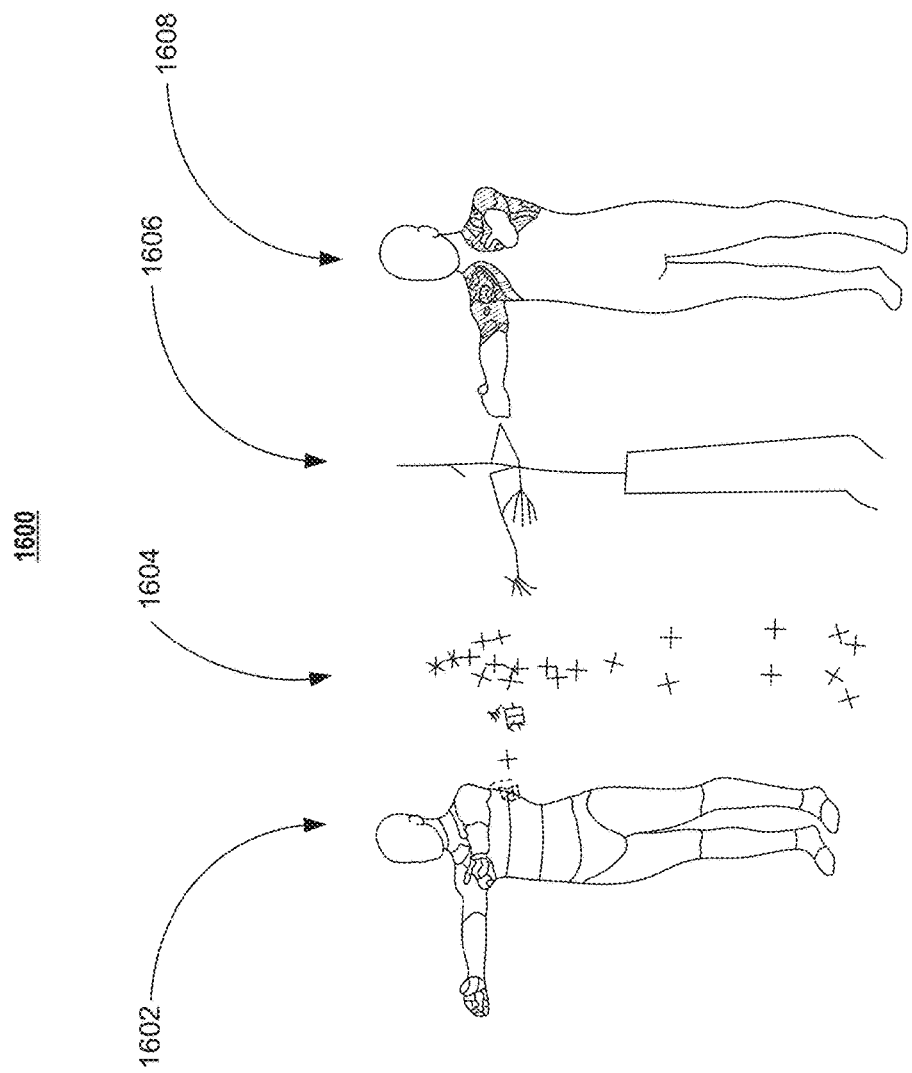
FIG. 16 is a diagram which illustrates an example technique for determining the positions and/or orientations of core skeletal joints in the rigging of a human avatar based on 3-D scans of a human model.

FIG. 16 is a diagram 1600 which summarizes some of the example techniques disclosed herein for determining the positions and/or orientations of core skeletal joints in the rigging of a human avatar based on 3-D scans of a human model. The diagram 1600 first shows a polygon mesh 1602 of a human avatar in a pose with the arms positioned forward horizontally. This polygon mesh 1602 can be generated from a 3-D scan of a human model in the same pose. The polygon mesh 1602 is partitioned into several articulation segments. Local coordinate systems 1604 for each of these articulation segments can then be calculated. As discussed herein, the local coordinate systems 1604 for the articulation segments can be determined by calculating a set of characteristic axes (e.g., principal components) and a center point (e.g., the centroid) for each of the articulation segments. The local coordinate systems 1604 are then used to specify the positions and orientations of the joints, or bones, of the core skeleton 1606 in the illustrated pose. Finally, the polygon mesh 1602 can be skinned to the core skeleton 1606 using any appropriate skinning technique, which results in the human avatar character 1608.

Example Embodiments

1. A method comprising: segmenting a polygon mesh of a digital character into a plurality of articulation segments; determining an indicator of position or orientation for each of the articulation segments of the polygon mesh; and transforming one or more joints of a skeleton associated with the polygon mesh based on a transform of the indicator of position or orientation for each of the articulation segments to move the polygon mesh from a first pose to a second pose.

2. The method of claim 1, wherein the polygon mesh is representative of a physical subject in a pose.

3. The method of claim 2, further comprising scanning the physical subject while in the pose.

4. The method of claim 2, further comprising: segmenting each of a plurality of polygon meshes, which are representative of the physical subject in a plurality of poses, into the plurality of articulation segments, each pose comprising a unique articulation of one or more body parts of the physical subject; determining an indicator of position or orientation for each of the articulation segments for each of the polygon meshes; and determining, based on the indicator of position or orientation of the each of the articulation segments, the position or orientation of the one or more joints for the plurality of poses.

5. The method of claim 4, further comprising creating a pose space for a pose space deformer based on the position or orientation of the one or more joints for the plurality of poses.

6. The method of claim 4, further comprising creating the plurality of polygon meshes by scanning the physical subject in the plurality of poses.

7. The method of claim 4, wherein the articulation segments of the polygon mesh consist essentially of vertices which change position or orientation substantially together as a group between different poses amongst the plurality of poses.

8. The method of claim 4, further comprising: identifying one of the polygon meshes as a base model; and performing an alignment operation to align the remaining polygon meshes with the base model.

9. The method of claim 8, wherein the alignment operation comprises an iterative closest point algorithm.

10. The method of claim 1, wherein determining an indicator of position or orientation for each of the articulation segments of the polygon mesh comprises determining a local coordinate system for each of the articulation segments.

11. The method of claim 10, wherein determining the local coordinate system for each of the articulation segments comprises determining characteristic axes for each of the articulation segments.

12. The method of claim 11, wherein the characteristic axes comprise orthogonal principal components of the set of vertices in the articulation segment.

13. The method of claim 12, further comprising determining the orthogonal principal components using eigen-decomposition or Singular Value Decomposition.

14. The method of claim 11, further comprising determining a first characteristic axis for each of the articulation segments, the first characteristic axis pointing in the direction of greatest spatial variation between the set of vertices in the articulation segment.

15. The method of claim 14, further comprising determining a second characteristic axis for each of the articulation segments, the second characteristic axis pointing in the direction of greatest spatial variation between the set of vertices in the articulation segment, subject to the constraint that the second characteristic axis is perpendicular to the first characteristic axis.

16. The method of claim 15, further comprising determining a third characteristic axis for each of the articulation segments, the third characteristic axis being perpendicular to both the first characteristic axis and the second characteristic axis.

17. The method of claim 11, further comprising determining a rotation matrix for each of the articulation segments which aligns a set of reference axes to the characteristic axes, or vice versa.

18. The method of claim 10, wherein determining the local coordinate system for each of the articulation segments comprises determining a center point of the set of vertices in the articulation segment.

19. The method of claim 18, wherein the center point comprises a centroid point.

20. The method of claim 10, further comprising comparing the local coordinate system for each of the articulation segments with a reference coordinate system.

21. The method of claim 1, further comprising loading a file which identifies vertices of each of the articulation segments.

22. The method of claim 1, further comprising identifying vertices of each of the articulation segments by: casting a plurality of rays from one of the joints; and identifying vertices which correspond to polygon faces which are intersected by the rays.

23. The method of claim 1, wherein the one or more joints are part of a core skeleton for the digital character.

24. The method of claim 1, further comprising displaying the digital character using a head-mounted, see-through augmented reality display.

25. The method of claim 24, further comprising displaying the digital character using a plurality of stacked waveguides corresponding to a plurality of depth planes.

26. A system comprising: non-transitory computer storage configured to store a polygon mesh; and a hardware processor in communication with the non-transitory computer storage, the hardware processor programmed to: segment the polygon mesh of a digital character into a plurality of articulation segments; determine an indicator of position or orientation for each of the articulation segments of the polygon mesh; and transform one or more joints of a skeleton associated with the polygon mesh based on a transform of the indicator of position or orientation for each of the articulation segments to move the polygon mesh from a first pose to a second pose.

27. The system of claim 26, wherein the polygon mesh is representative of a physical subject in a pose.

28. The system of claim 27, wherein the polygon mesh is created by scanning the physical subject while in the pose.

29. The system of claim 27, wherein the hardware processor is further configured to: segment each of a plurality of polygon meshes, which are representative of the physical subject in the plurality of poses, into the plurality of articulation segments, each pose comprising a unique articulation of one or more body parts of the physical subject; determine an indicator of position or orientation for each of the articulation segments for each of the polygon meshes; determine, based on the indicator of position or orientation of each of the articulation segments, the position or orientation of the one or more joints for the plurality of poses.

30. The system of claim 29, wherein the hardware processor is further configured to create a pose space for a pose space deformer based on the position or orientation of the one or more joints for the plurality of poses.

31. The system of claim 29, wherein the plurality of polygon meshes are created by scanning the physical subject in the plurality of poses.

32. The system of claim 29, wherein the articulation segments of the polygon mesh consist essentially of vertices which change position or orientation substantially together as a group between different poses amongst the plurality of poses.

33. The system of claim 29, wherein the hardware processor is further configured to: identify one of the polygon meshes as a base model; and perform an alignment operation to align the remaining polygon meshes with the base model.

34. The system of claim 33, wherein the alignment operation comprises an iterative closest point algorithm.

35. The system of claim 26, wherein the hardware processor is configured to determine the position or orientation for each of the articulation segments of the polygon mesh by determining a local coordinate system for each of the articulation segments.

36. The system of claim 35, wherein the hardware processor is configured to determine the local coordinate system for each of the articulation segments by determining characteristic axes for each of the articulation segments.

37. The system of claim 36, wherein the characteristic axes comprise orthogonal principal components of the set of vertices in the articulation segment.

38. The system of claim 37, wherein the hardware processor is configured to determine the orthogonal principal components using eigen-decomposition or Singular Value Decomposition.

39. The system of claim 36, wherein the hardware processor is further configured to determine a first characteristic axis for each of the articulation segments, the first characteristic axis pointing in the direction of greatest spatial variation between the set of vertices in the articulation segment.

40. The system of claim 39, wherein the hardware processor is further configured to determine a second characteristic axis for each of the articulation segments, the second characteristic axis pointing in the direction of greatest spatial variation between the set of vertices in the articulation segment, subject to the constraint that the second characteristic axis is perpendicular to the first characteristic axis.

41. The system of claim 40, wherein the hardware processor is further configured to determine a third characteristic axis for each of the articulation segments, the third characteristic axis being perpendicular to both the first characteristic axis and the second characteristic axis.

42. The system of claim 36, wherein the hardware processor is further configured to determine a rotation matrix for each of the articulation segments which aligns a set of reference axes to the characteristic axes, or vice versa.

43. The system of claim 35, wherein the hardware processor is configured to determine the local coordinate system for each of the articulation segments by determining a center point of the set of vertices in the articulation segment.

44. The system of claim 43, wherein the center point comprises a centroid point.

45. The system of claim 35, wherein the hardware processor is further configured to compare the local coordinate system for each of the articulation segments with a reference coordinate system.

46. The system of claim 26, wherein the hardware processor is further configured to load a file from the non-transitory computer storage which identifies the vertices of each of the articulation segments.

47. The system of claim 26, wherein the hardware processor is further configured to identify the vertices of each of the articulation segments by: casting a plurality of rays from one of the plurality of joints; and identifying vertices which correspond to polygon faces which are intersected by the rays.

48. The system of claim 26, wherein the one or more joints are part of a core skeleton for the digital character.

49. The system of claim 26, further comprising a head-mounted, see-through augmented reality display configured to display the digital character.

50. The system of claim 49, wherein the augmented reality display comprises a plurality of stacked waveguides corresponding to a plurality of depth planes.

51. A non-transitory computer-readable medium which, when read by a computer, causes the computer to perform a method comprising: segmenting a polygon mesh of a digital character into a plurality of articulation segments; determining an indicator of position or orientation for each of the articulation segments of the polygon mesh; and transforming one or more joints of a skeleton associated with the polygon mesh based on a transform of the indicator of position or orientation for each of the articulation segments to move the polygon mesh from a first pose to a second pose.

52. The computer readable medium of claim 47, wherein the polygon mesh is representative of a physical subject in a pose.

53. The computer readable medium of claim 48, wherein the method further comprises scanning the physical subject while in the pose.

54. The computer readable medium of claim 48, wherein the method further comprises: segmenting each of a plurality of polygon meshes, which are representative of the physical subject in a plurality of poses, into the plurality of articulation segments, each pose comprising a unique articulation of one or more body parts of the physical subject; determining an indicator of position or orientation for each of the articulation segments for each of the polygon meshes; and determining, based on the indicator of position or orientation of the each of the articulation segments, the position or orientation of the one or more joints for the plurality of poses.

55. The computer readable medium of claim 50, wherein the method further comprises creating a pose space for a pose space deformer based on the position or orientation of the one or more joints for the plurality of poses.

56. The computer readable medium of claim 50, wherein the method further comprises creating the plurality of polygon meshes by scanning the physical subject in the plurality of poses.

57. The computer readable medium of claim 50, wherein the articulation segments of the polygon mesh consist essentially of vertices which change position or orientation substantially together as a group between different poses amongst the plurality of poses.

58. The computer readable medium of claim 50, wherein the method further comprises: identifying one of the polygon meshes as a base model; and performing an alignment operation to align the remaining polygon meshes with the base model.

59. The computer readable medium of claim 54, wherein the alignment operation comprises an iterative closest point algorithm.

60. The computer readable medium of claim 47, wherein determining an indicator of position or orientation for each of the articulation segments of the polygon mesh comprises determining a local coordinate system for each of the articulation segments.

61. The computer readable medium of claim 56, wherein determining the local coordinate system for each of the articulation segments comprises determining characteristic axes for each of the articulation segments.

62. The computer readable medium of claim 57, wherein the characteristic axes comprise orthogonal principal components of the set of vertices in the articulation segment.

63. The computer readable medium of claim 58, wherein the method further comprises determining the orthogonal principal components using eigen-decomposition or Singular Value Decomposition.

64. The computer readable medium of claim 57, wherein the method further comprises determining a first characteristic axis for each of the articulation segments, the first characteristic axis pointing in the direction of greatest spatial variation between the set of vertices in the articulation segment.

65. The computer readable medium of claim 60, wherein the method further comprises determining a second characteristic axis for each of the articulation segments, the second characteristic axis pointing in the direction of greatest spatial variation between the set of vertices in the articulation segment, subject to the constraint that the second characteristic axis is perpendicular to the first characteristic axis.

66. The computer readable medium of claim 61, wherein the method further comprises determining a third characteristic axis for each of the articulation segments, the third characteristic axis being perpendicular to both the first characteristic axis and the second characteristic axis.

67. The computer readable medium of claim 57, wherein the method further comprises determining a rotation matrix for each of the articulation segments which aligns a set of reference axes to the characteristic axes, or vice versa.

68. The computer readable medium of claim 56, wherein determining the local coordinate system for each of the articulation segments comprises determining a center point of the set of vertices in the articulation segment.

69. The computer readable medium of claim 64, wherein the center point comprises a centroid point.

70. The computer readable medium of claim 56, wherein the method further comprises comparing the local coordinate system for each of the articulation segments with a reference coordinate system.

71. The computer readable medium of claim 47, wherein the method further comprises loading a file which identifies vertices of each of the articulation segments.

72. The computer readable medium of claim 47, wherein the method further comprises identifying vertices of each of the articulation segments by: casting a plurality of rays from one of the joints; and identifying vertices which correspond to polygon faces which are intersected by the rays.

73. The computer readable medium of claim 47, wherein the one or more joints are part of a core skeleton for the digital character.

74. A method comprising: determining at least one articulation segment of a polygon mesh, the articulation segment comprising a subset of vertices in the polygon mesh; determining an indicator of the position or orientation of the articulation segment of the polygon mesh; and determining, based on the indicator of the position or orientation of the articulation segment, the position or orientation of at least one joint for deforming the polygon mesh.

75. The method of claim 74, wherein the polygon mesh is representative of a physical subject in a pose.

76. The method of claim 75, further comprising scanning the physical subject while in the pose.

77. The method of claim 75, further comprising: determining at least one articulation segment for each of a plurality of polygon meshes which are representative of the physical subject in a plurality of poses, each pose comprising a unique articulation of one or more body parts of the physical subject; determining an indicator of the position or orientation of the articulation segment for each of the polygon meshes; and determining, based on the indicator of the position or orientation of the articulation segment, the position or orientation of the joint for the plurality of poses.

78. The method of claim 77, further comprising creating a pose space for a pose space deformer based on the position or orientation of the joint for the plurality of poses.

79. The method of claim 77, further comprising creating the plurality of polygon meshes by scanning the physical subject in the plurality of poses.

80. The method of claim 77, wherein the articulation segment of the polygon mesh consists essentially of vertices which change position or orientation substantially together as a group between different poses amongst the plurality of poses.

81. The method of claim 77, further comprising: identifying one of the polygon meshes as a base model; and performing an alignment operation to align the remaining polygon meshes with the base model.

82. The method of claim 81, wherein the alignment operation comprises an iterative closest point algorithm.

83. The method of claim 74, wherein determining the indicator of the position or orientation of the articulation segment of the polygon mesh comprises determining a local coordinate system for the articulation segment.

84. The method of claim 83, wherein determining the local coordinate system for the articulation segment comprises determining characteristic axes for the articulation segment.

85. The method of claim 84, wherein the characteristic axes comprise orthogonal principal components of the set of vertices in the articulation segment.

86. The method of claim 85, wherein the orthogonal principal components are determined using eigen-decomposition or Singular Value Decomposition.

87. The method of claim 84, further comprising determining a first characteristic axis, the first characteristic axis pointing in the direction of greatest spatial variation between the set of vertices in the articulation segment.

88. The method of claim 87, further comprising determining a second characteristic axis, the second characteristic axis pointing in the direction of greatest spatial variation between the set of vertices in the articulation segment, subject to the constraint that the second characteristic axis is perpendicular to the first characteristic axis.

89. The method of claim 88, further comprising determining a third characteristic axis, the third characteristic axis being perpendicular to both the first characteristic axis and the second characteristic axis.

90. The method of claim 84, further comprising determining a rotation matrix which aligns a set of reference axes to the characteristic axes, or vice versa.

91. The method of claim 83, wherein determining the local coordinate system for the articulation segment comprises determining a center point of the set of vertices in the articulation segment.

92. The method of claim 91, wherein the center point comprises a centroid point.

93. The method of claim 83, further comprising comparing the local coordinate system for the articulation segment with a reference coordinate system.

94. The method of claim 74, further comprising loading a file which identifies the vertices of the articulation segment.

95. The method of claim 74, further comprising identifying the vertices of the articulation segment by: casting a plurality of rays from one of the plurality of joints; and identifying vertices which correspond to polygon faces which are intersected by the rays.

96. The method of claim 74, wherein the joint is part of a core skeleton for a virtual character.

97. The method of claim 74, further comprising displaying the digital character using a head-mounted, see-through augmented reality display.

98. The method of claim 97, further comprising displaying the digital character using a plurality of stacked waveguides corresponding to a plurality of depth planes.

99. A system comprising: non-transitory computer storage configured to store a polygon mesh; and a hardware processor in communication with the non-transitory computer storage, the hardware processor programmed to: determine at least one articulation segment of the polygon mesh, the articulation segment comprising a subset of vertices in the polygon mesh; determine an indicator of the position or orientation of the articulation segment of the polygon mesh; and determine, based on the indicator of the position or orientation of the articulation segment, the position or orientation of at least one joint for deforming the polygon mesh.

100. The system of claim 99, wherein the polygon mesh is representative of a physical subject in a pose.

101. The system of claim 100, wherein the polygon mesh is created by scanning the physical subject while in the pose.

102. The system of claim 100, wherein the hardware processor is further configured to: determine at least one articulation segment for each of a plurality of polygon meshes which are representative of the physical subject in the plurality of poses, each pose comprising a unique articulation of one or more body parts of the physical subject; determine an indicator of the position or orientation of the articulation segment for each of the polygon meshes; determine, based on the indicator of the position or orientation of the articulation segment, the position or orientation of the joint for the plurality of poses.

103. The system of claim 102, wherein the hardware processor is further configured to create a pose space for a pose space deformer based on the position or orientation of the joint for the plurality of poses.

104. The system of claim 102, wherein the plurality of polygon meshes are created by scanning the physical subject in the plurality of poses.

105. The system of claim 102, wherein the articulation segment of the polygon mesh consists essentially of vertices which change position or orientation substantially together as a group between different poses amongst the plurality of poses.

106. The system of claim 102, wherein the hardware processor is further configured to: identify one of the polygon meshes as a base model; and perform an alignment operation to align the remaining polygon meshes with the base model.

107. The system of claim 106, wherein the alignment operation comprises an iterative closest point algorithm.

108. The system of claim 99, wherein the hardware processor is configured to determine the indicator of the position or orientation of the articulation segment of the polygon mesh by determining a local coordinate system for the articulation segment.

109. The system of claim 108, wherein the hardware processor is configured to determine the local coordinate system for the articulation segment by determining characteristic axes for the articulation segment.

110. The system of claim 109, wherein the characteristic axes comprise orthogonal principal components of the set of vertices in the articulation segment.

111. The system of claim 110, wherein the hardware processor is configured to determine the orthogonal principal components using eigen-decomposition or Singular Value Decomposition.

112. The system of claim 109, wherein the hardware processor is further configured to determine a first characteristic axis, the first characteristic axis pointing in the direction of greatest spatial variation between the set of vertices in the articulation segment.

113. The system of claim 112, wherein the hardware processor is further configured to determine a second characteristic axis, the second characteristic axis pointing in the direction of greatest spatial variation between the set of vertices in the articulation segment, subject to the constraint that the second characteristic axis is perpendicular to the first characteristic axis.

114. The system of claim 113, wherein the hardware processor is further configured to determine a third characteristic axis, the third characteristic axis being perpendicular to both the first characteristic axis and the second characteristic axis.

115. The system of claim 109, wherein the hardware processor is further configured to determine a rotation matrix which aligns a set of reference axes to the characteristic axes, or vice versa.

116. The system of claim 108, wherein the hardware processor is configured to determine the local coordinate system for the articulation segment by determining a center point of the set of vertices in the articulation segment.

117. The system of claim 116, wherein the center point comprises a centroid point.

118. The system of claim 108, wherein the hardware processor is further configured to compare the local coordinate system for the articulation segment with a reference coordinate system.

119. The system of claim 99, wherein the hardware processor is further configured to load a file from the non-transitory computer storage which identifies the vertices of the articulation segment.

120. The system of claim 99, wherein the hardware processor is further configured to identify the vertices of the articulation segment by: casting a plurality of rays from one of the plurality of joints; and identifying vertices which correspond to polygon faces which are intersected by the rays.

121. The system of claim 99, wherein the joint is part of a core skeleton for a virtual character.

122. The system of claim 99, further comprising a head-mounted, see-through augmented reality display configured to display the digital character.

123. The system of claim 122, wherein the augmented reality display comprises a plurality of stacked waveguides corresponding to a plurality of depth planes.

124. A non-transitory computer-readable medium which, when read by a computer, causes the computer to perform a method comprising: determining at least one articulation segment of a polygon mesh, the articulation segment comprising a subset of vertices in the polygon mesh; determining an indicator of the position or orientation of the articulation segment of the polygon mesh; and determining, based on the indicator of the position or orientation of the articulation segment, the position or orientation of at least one joint for deforming the polygon mesh.

125. The computer-readable medium of claim 116, wherein the polygon mesh is representative of a physical subject in a pose.

126. The computer-readable medium of claim 117, wherein the polygon mesh is created by scanning the physical subject while in the pose.

127. The computer-readable medium of claim 117, wherein the method further comprises: determining at least one articulation segment for each of a plurality of polygon meshes which are representative of the physical subject in the plurality of poses, each pose comprising a unique articulation of one or more body parts of the physical subject; determining an indicator of the position or orientation of the articulation segment for each of the polygon meshes; determining, based on the indicator of the position or orientation of the articulation segment, the position or orientation of the joint for the plurality of poses.

128. The computer-readable medium of claim 119, further comprising creating a pose space for a pose space deformer based on the position or orientation of the joint for the plurality of poses.

129. The computer-readable medium of claim 119, wherein the plurality of polygon meshes are created by scanning the physical subject in the plurality of poses.

130. The computer-readable medium of claim 119, wherein the articulation segment of the polygon mesh consists essentially of vertices which change position or orientation substantially together as a group between different poses amongst the plurality of poses.

131. The computer-readable medium of claim 119, wherein the method further comprises: identifying one of the polygon meshes as a base model; and performing an alignment operation to align the remaining polygon meshes with the base model.

132. The computer-readable medium of claim 123, wherein the alignment operation comprises an iterative closest point algorithm.

133. The computer-readable medium of claim 116, wherein determining the indicator of the position or orientation of the articulation segment of the polygon mesh comprises determining a local coordinate system for the articulation segment.

134. The computer-readable medium of claim 125, wherein determining the local coordinate system for the articulation segment comprises determining characteristic axes for the articulation segment.

135. The computer-readable medium of claim 126, wherein the characteristic axes comprise orthogonal principal components of the set of vertices in the articulation segment.

136. The computer-readable medium of claim 127, wherein the orthogonal principal components are determined using eigen-decomposition or Singular Value Decomposition.

137. The computer-readable medium of claim 126, wherein the method further comprises determining a first characteristic axis, the first characteristic axis pointing in the direction of greatest spatial variation between the set of vertices in the articulation segment.

138. The computer-readable medium of claim 129, wherein the method further comprises determining a second characteristic axis, the second characteristic axis pointing in the direction of greatest spatial variation between the set of vertices in the articulation segment, subject to the constraint that the second characteristic axis is perpendicular to the first characteristic axis.

139. The computer-readable medium of claim 130, wherein the method further comprises determining a third characteristic axis, the third characteristic axis being perpendicular to both the first characteristic axis and the second characteristic axis.

140. The computer-readable medium of claim 126, wherein the method further comprises determining a rotation matrix which aligns a set of reference axes to the characteristic axes, or vice versa.

141. The computer-readable medium of claim 125, wherein determining the local coordinate system for the articulation segment comprises determining a center point of the set of vertices in the articulation segment.

142. The computer-readable medium of claim 133, wherein the center point comprises a centroid point.

143. The computer-readable medium of claim 116, wherein the method further comprises comparing the local coordinate system for the articulation segment with a reference coordinate system.

144. The computer-readable medium of claim 116, wherein the method further comprises loading a file which identifies the vertices of the articulation segment.

145. The computer-readable medium of claim 116, wherein the method further comprises identifying the vertices of the articulation segment by: casting a plurality of rays from one of the plurality of joints; and identifying vertices which correspond to polygon faces which are intersected by the rays.

146. The computer-readable medium of claim 116, wherein the joint is part of a core skeleton for a virtual character.

147. A method comprising: automatically fitting a skeleton to a digital scan of a human in a second pose by converting the digital scan to a polygon mesh; dividing the polygon mesh into segments; adding a coordinate system to each segment; calculating a transform for each segment when moving from a first pose to the second pose; and moving the skeleton based on the transform for each segment.

148. A system comprising: non-transitory computer storage configured to store a polygon mesh; and a hardware processor in communication with the non-transitory computer storage, the hardware processor programmed to: automatically fit a skeleton to a digital scan of a human in a second pose by converting the digital scan to the polygon mesh; divide the polygon mesh into segments; adding a coordinate system to each segment; calculate a transform for each segment when moving from a first pose to the second pose; and move the skeleton based on the transform for each segment.

149. A non-transitory computer-readable medium which, when read by a computer, causes the computer to perform a method comprising: automatically fitting a skeleton to a digital scan of a human in a second pose by converting the digital scan to a polygon mesh; dividing the polygon mesh into segments; adding a coordinate system to each segment; calculating a transform for each segment when moving from a first pose to the second pose; and moving the skeleton based on the transform for each segment.

150. A method of automatically fitting a skeleton to a scan comprising: correlating a skeleton of a digital character to a first, second, and third principal component associated with each of a plurality of articulation segments of a polygon mesh of the digital character.

151. A system comprising: non-transitory computer storage configured to store a polygon mesh; and a hardware processor in communication with the non-transitory computer storage, the hardware processor programmed to: correlate a skeleton of a digital character to a first, second, and third principal component associated with each of a plurality of articulation segments of the polygon mesh of the digital character.

152. A non-transitory computer-readable medium which, when read by a computer, causes the computer to perform a method comprising: correlating a skeleton of a digital character to a first, second, and third principal component associated with each of a plurality of articulation segments of a polygon mesh of the digital character.

153. A method comprising: correlating a skeleton of a digital character to the first three principal components of an eigen-decomposition-based principal component analysis associated with each of a plurality of articulation segments of a polygon mesh of the digital character.

154. A system comprising: non-transitory computer storage configured to store a polygon mesh; and a hardware processor in communication with the non-transitory computer storage, the hardware processor programmed to: correlate a skeleton of a digital character to the first three principal components of an eigen-decomposition-based principal component analysis associated with each of a plurality of articulation segments of the polygon mesh of the digital character.

155. A non-transitory computer-readable medium which, when read by a computer, causes the computer to perform a method comprising: correlating a skeleton of a digital character to the first three principal components of an eigen-decomposition-based principal component analysis associated with each of a plurality of articulation segments of a mesh of the digital character.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
    segmenting a polygon mesh of a digital character into a plurality of articulation segments by casting a plurality of rays from each of a plurality of joints of a skeleton associated with the polygon mesh and identifying vertices which correspond to polygon faces which are intersected by the rays from the respective joints;
    determining an indicator of position or orientation for each of the articulation segments of the polygon mesh; and
    transforming one or more of the joints of the skeleton based on a transform of the indicator of position or orientation for each of the articulation segments to move the polygon mesh from a first pose to a second pose,
    wherein the identifying the vertices that correspond to the polygon faces that are intersected by the rays from the respective joints includes: assigning each of the vertices to a corresponding one of the joints based on the intersection between the respect ray cast from each of the joints and the respective vertex in order to identify the articulation segments, and
    wherein the identifying the vertices that correspond to the polygon faces that are intersected by the rays from the respective joints includes creating mappings between subsets of the assigned vertices and the articulation segments.

2. The method of claim 1, wherein the polygon mesh is representative of a physical subject in a pose.

3. The method of claim 2, further comprising scanning the physical subject while in the pose.

4. The method of claim 2, further comprising:
- segmenting each of a plurality of polygon meshes, which are representative of the physical subject in a plurality of poses, into the plurality of articulation segments, each pose comprising a unique articulation of one or more body parts of the physical subject;
- determining an indicator of position or orientation for each of the articulation segments for each of the polygon meshes; and
- determining, based on the indicator of position or orientation of the each of the articulation segments, the position or orientation of the one or more joints for the plurality of poses.

5. The method of claim 4, further comprising creating a pose space for a pose space deformer based on the position or orientation of the one or more joints for the plurality of poses.

6. The method of claim 4, further comprising creating the plurality of polygon meshes by scanning the physical subject in the plurality of poses.

7. The method of claim 4, wherein the articulation segments of the polygon mesh consist essentially of vertices which change position or orientation substantially together as a group between different poses amongst the plurality of poses.

8. The method of claim 4, further comprising:
- identifying one of the polygon meshes as a base model; and
- performing an alignment operation to align the remaining polygon meshes with the base model, the alignment operation comprising an iterative closest point algorithm.

9. The method of claim 1, wherein determining an indicator of position or orientation for each of the articulation segments of the polygon mesh comprises determining a local coordinate system for each of the articulation segments.

10. The method of claim 9, wherein determining the local coordinate system for each of the articulation segments comprises determining characteristic axes for each of the articulation segments.

11. The method of claim 10, wherein the characteristic axes comprise orthogonal principal components of the set of vertices in the articulation segment.

12. The method of claim 11, further comprising determining the orthogonal principal components using eigen-decomposition or Singular Value Decomposition.

13. The method of claim 10, further comprising determining a first characteristic axis for each of the articulation segments, the first characteristic axis pointing in the direction of greatest spatial variation between the set of vertices in the articulation segment.

14. The method of claim 13, further comprising determining a second characteristic axis for each of the articulation segments, the second characteristic axis pointing in the direction of greatest spatial variation between the set of vertices in the articulation segment, subject to the constraint that the second characteristic axis is perpendicular to the first characteristic axis.

15. The method of claim 14, further comprising determining a third characteristic axis for each of the articulation segments, the third characteristic axis being perpendicular to both the first characteristic axis and the second characteristic axis.

16. The method of claim 10, further comprising determining a rotation matrix for each of the articulation segments which aligns a set of reference axes to the characteristic axes, or vice versa.

17. The method of claim 9, wherein determining the local coordinate system for each of the articulation segments comprises determining a center point of the set of vertices in the articulation segment, and wherein the center point comprises a centroid point.

18. The method of claim 9, further comprising comparing the local coordinate system for each of the articulation segments with a reference coordinate system.

19. The method of claim 1, further comprising loading a file which identifies vertices of each of the articulation segments.

20. The method of claim 1, wherein the one or more joints are part of a core skeleton for the digital character.

21. The method of claim 1, further comprising displaying the digital character using a head-mounted, see-through augmented reality display.

22. The method of claim 21, further comprising displaying the digital character using a plurality of stacked waveguides corresponding to a plurality of depth planes.

* * * * *